US012672152B2

(12) United States Patent
Chen et al.

(10) Patent No.: US 12,672,152 B2
(45) Date of Patent: Jun. 30, 2026

(54) WIRELESS COMMUNICATION METHOD AND APPARATUS AND SYSTEM

(71) Applicant: 1FINITY Inc., Kawasaki (JP)

(72) Inventors: Zhe Chen, Beijing (CN); Lei Zhang, Beijing (CN); Jian Zhang, Beijing (CN); Qinyan Jiang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 502 days.

(21) Appl. No.: 18/130,971

(22) Filed: Apr. 5, 2023

(65) Prior Publication Data

US 2023/0269753 A1 Aug. 24, 2023

Related U.S. Application Data

(63) Continuation of application No. PCT/CN2020/121045, filed on Oct. 15, 2020.

(51) Int. Cl.
*H04W 72/232* (2023.01)

(52) U.S. Cl.
CPC ................................. *H04W 72/232* (2023.01)

(58) Field of Classification Search
CPC ... H04L 5/0026; H04L 5/0044; H04L 5/0048; H04L 5/0053; H04L 5/0082; H04L 5/0091; H04W 72/232
USPC ....................................................... 370/329
See application file for complete search history.

(56) References Cited

U.S. PATENT DOCUMENTS

| | | | |
|---|---|---|---|
| 11,902,973 B2* | 2/2024 | Bagheri | ................. H04W 72/23 |
| 2019/0141693 A1 | 5/2019 | Guo et al. | |

| | | | |
|---|---|---|---|
| 2019/0260445 A1 | 8/2019 | Wilson et al. | |
| 2019/0319767 A1 | 10/2019 | Sun et al. | |
| 2020/0045700 A1* | 2/2020 | Sun | ......................... H04L 5/0091 |
| 2020/0314818 A1 | 10/2020 | Jin et al. | |
| 2020/0351892 A1* | 11/2020 | Yi | .......................... H04W 72/53 |
| 2020/0404690 A1 | 12/2020 | Lee et al. | |
| 2021/0227526 A1* | 7/2021 | Khoshnevisan | .... H04W 72/044 |
| 2021/0259001 A1* | 8/2021 | Park | ................. H04W 72/0453 |
| 2021/0337572 A1 | 10/2021 | Ji et al. | |
| 2022/0046635 A1* | 2/2022 | Liou | .................... H04B 7/0691 |

(Continued)

FOREIGN PATENT DOCUMENTS

| | | |
|---|---|---|
| CN | 109792745 A | 5/2019 |
| CN | 111436129 A | 7/2020 |

(Continued)

OTHER PUBLICATIONS

Notice of Reasons for Refusal issued by the Japan Patent Office for corresponding Japanese Patent Application No. 2023-521302, mailed on Mar. 5, 2024, with an English translation.

(Continued)

*Primary Examiner* — Robert J Lopata
(74) *Attorney, Agent, or Firm* — Myers Wolin, LLC

(57) ABSTRACT

A wireless communication apparatus, configured in a terminal equipment, includes a receiver configured to receive control information, the control information triggering a physical downlink shared channel, reception or monitoring of the control information being related to two TCI states, and a DCI format corresponding to the control information including no TCI field, and a processor configured to transmit or receive the physical downlink shared channel according to the two TCI states or according to one of the two TCI states.

9 Claims, 14 Drawing Sheets

┌─ 101 a terminal equipment receives control information, the control information triggering a channel or a signal, reception or monitoring of the control information being related to two TCI states, and a DCI format corresponding to the control information including no TCI field

┌─ 102 the terminal equipment transmits or receives the channel or the signal according to the two TCI states or according to one of the two TCI states

(56)                    References Cited

U.S. PATENT DOCUMENTS

| | | | | |
|---|---|---|---|---|
| 2022/0078766 A1 | 3/2022 | Li | | |
| 2022/0255703 A1* | 8/2022 | Song | .................... | H04W 72/04 |
| 2022/0352969 A1* | 11/2022 | Yang | .................... | H04L 5/0053 |
| 2023/0155783 A1* | 5/2023 | Liu | ....................... | H04L 5/0098 |
| | | | | 370/329 |
| 2023/0156488 A1* | 5/2023 | Song | ................. | H04B 7/06968 |
| | | | | 370/329 |
| 2024/0015740 A1* | 1/2024 | Xiao | ................ | H04W 72/1273 |

FOREIGN PATENT DOCUMENTS

| | | | |
|---|---|---|---|
| CN | 111713033 A | 9/2020 | |
| CN | 111758278 A | 10/2020 | |
| JP | 2023-541994 A | 10/2023 | |
| WO | 2020/143801 A1 | 7/2020 | |
| WO | 2022/061118 A2 | 3/2022 | |

OTHER PUBLICATIONS

Huawei et al., "Summary of Proposals for M-TRP Offline Session on Thursday", Agenda Item: 7.2.8.2, 3GPP TSG-RAN WG1 Meeting #99, R1-1913518, Reno, USA, Nov. 18-22, 2019.

The Extended European search report with the Supplementary European search report and the European search opinion, issued by the European Patent Office for corresponding European Patent Application No. 20957089.4, mailed on Nov. 21, 2023.

Vivo, "Discussion on remaining issues on M-TRP and text proposals", Agenda Item: 7.2.6.2, 3GPP TSG RAN WG1#100, R1-2000333, e-Meeting, Feb. 24-Mar. 6, 2020.

Spreadtrum Communications, "Discussion on remaining issues for multi-TRP operation", Agenda Item: 7.2.6, 3GPP TSG-RAN WG1 #102-e, R1-2006257, e-Meeting, Aug. 17-28, 2020.

First Notification of Office Action and Search Report issued by the China National Intellectual Property Administration for corresponding Chinese Patent Application No. 202080105346.1, mailed on Apr. 15, 2024, with an English translation.

International Search Report and Written Opinion of the International Searching Authority issued by the China National Intellectual Property Administration for corresponding International Patent Application No. PCT/CN2020/121045, mailed on Jun. 30, 2021, with an English translation.

NTT Docomo, Inc., "Enhancements on multi-TRP/panel transmission", Agenda Item: 7.2.8.2, 3GPP TSG-RAN WG1 Meeting #98bis, R1-1911184, Chongqing, China, Oct. 14-20, 2019.

Huawei et al., "Feature Summary of Enhancements on Multi-TRP/Panel Transmission", Agenda Item: 7.2.8.2, 3GPP TSG-RAN WG1 Meeting #99, R1-1913299, Reno, USA, Nov. 18-22, 2019.

The First Examination Report issued by the Indian Patent Office for corresponding Indian Patent Application No. 202337024641, mailed on Apr. 3, 2024, with an English translation.

Notice of Preliminary Rejection issued by The Korean Intellectual Property Office for corresponding KR patent application No. 10-2023-7011628, mailed on Jun. 25, 2025, with an English translation.

* cited by examiner

101 a terminal equipment receives control information, the control information triggering a channel or a signal, reception or monitoring of the control information being related to two TCI states, and a DCI format corresponding to the control information including no TCI field

102 the terminal equipment transmits or receives the channel or the signal according to the two TCI states or according to one of the two TCI states

FIG. 1

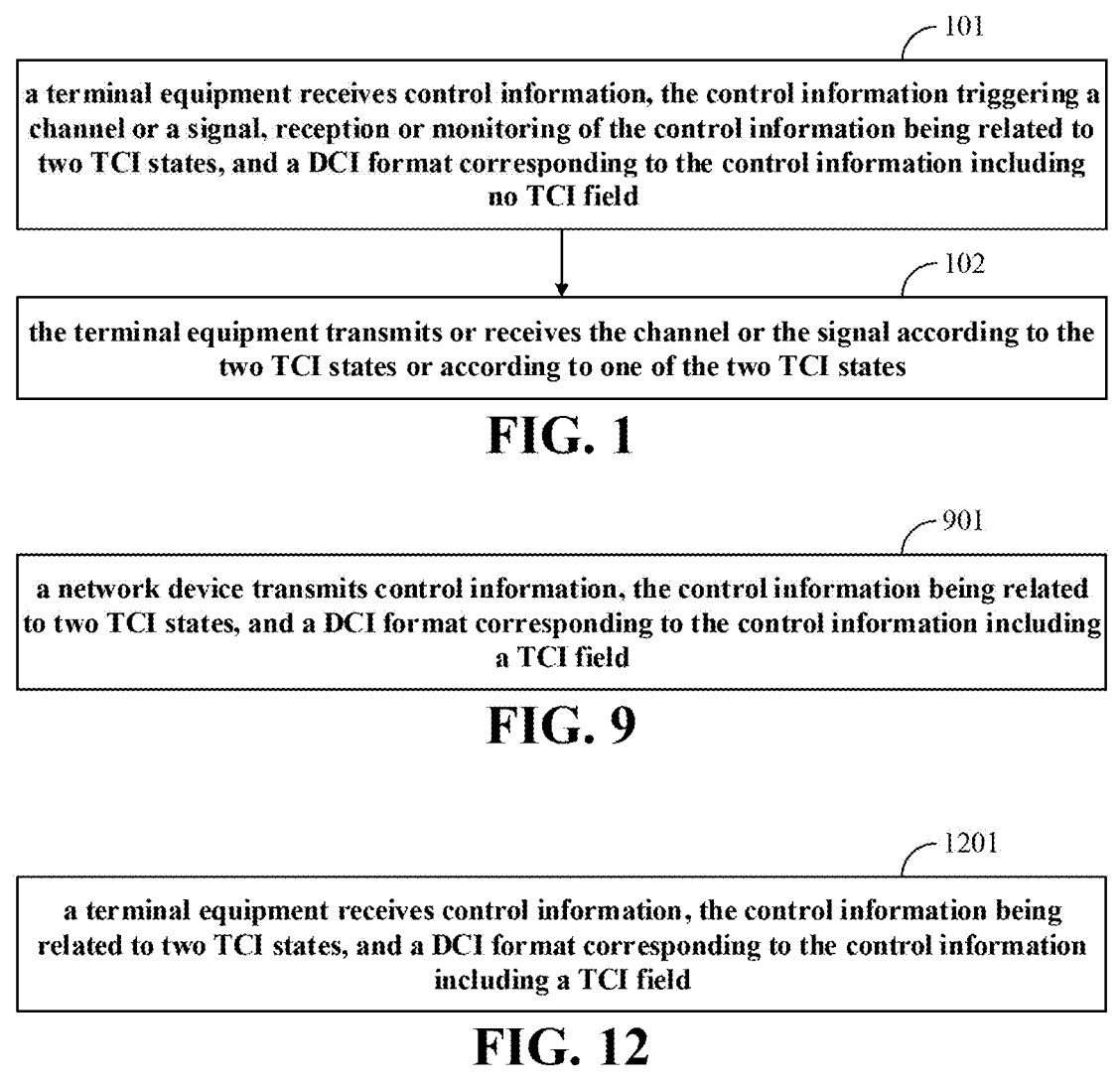

901 a network device transmits control information, the control information being related to two TCI states, and a DCI format corresponding to the control information including a TCI field

FIG. 9

1201 a terminal equipment receives control information, the control information being related to two TCI states, and a DCI format corresponding to the control information including a TCI field

FIG. 12

Slot n

> timeDurationForQCL

| | | | | |
|---|---|---|---|---|
| #1 | #2 | | TCI#1 | #1-1 |
| #1 | #2 | | TCI#2 | #1-2 |
| #1 | #2 | | TCI#1 | #2-1 |
| #1 | #2 | | TCI#2 | #2-2 |
| #1 | #2 | | TCI#1 | #3-1 |
| #1 | #2 | | TCI#2 | #3-2 |

TDM
PDCCH → SS#1
SS#1 → CORESET#1
CORESET#1 → TCI#1, TCI#2
SCS = 60 kHz (FR2)
*timeDurationForQCL* = 7 symbols DM-RS
PT-RS
Data
PDCCH
CORESET#1

FDM
PDCCH → SS#1
SS#1 → CORESET#1
CORESET#1 → TCI#1, TCI#2
SCS = 60 kHz (FR2)
*timeDurationForQCL* = 7 symbols

DM-RS

PT-RS

Data

PDCCH

CORESET#1

TDM
PDCCH#rep1 → SS#1
PDCCH#rep2 → SS#2
SS#1, SS#2 → CORESET#1
CORESET#1 → TCI#1, TCI#2
SCS = 60 kHz (FR2)
*timeDurationForQCL* = 7 symbols

DM-RS

PT-RS

Data

PDCCH#rep1          PDCCH#rep2

CORESET#1

Slot n

TDM
PDCCH → SS#1
SS#1 → CORESET#1
CORESET#1 → TCI#1, TCI#2
SCS = 60 kHz (FR2)
*timeDurationForQCL* = 7 symbols

DM-RS

Data

PDCCH

CORESET#1

Slot n

TDM
PDCCH → SS#1
SS#1 → CORESET#1
CORESET#1 → TCI#1, TCI#2
PDCCH → TCI field → TCI#3

SCS = 60 kHz (FR2)
*timeDurationForQCL* = 7 symbols

DM-RS

Data

PDCCH

CORESET#1

TDM
PDCCH → SS#1
SS#1 → CORESET#1
CORESET#1 → TCI#1, TCI#2
PDCCH → TCI field → TCI#3, TCI#4

SCS = 60 kHz (FR2)
*timeDurationForQCL* = 7 symbols

⊠ DM-RS

▨ Data

▨ PDCCH

☐ CORESET#1

Slot n

TDM
PDCCH → SS#1
SS#1 → CORESET#1
CORESET#1 → TCI#1, TCI#2
PDCCH → TCI field → TCI#3

SCS = 60 kHz (FR2)
*timeDurationForQCL* = 7 symbols

▨ DM-RS

▧ Data

▨ PDCCH

▢ CORESET#1

TDM
PDCCH → SS#1
SS#1 → CORESET#1
CORESET#1 → TCI#1, TCI#2
PDCCH → TCI field → TCI#3, TCI#4

SCS = 60 kHz (FR2)
*timeDurationForQCL* = 7 symbols

DM-RS

Data

PDCCH

CORESET#1

WIRELESS COMMUNICATION METHOD AND APPARATUS AND SYSTEM

CROSS-REFERENCE TO RELATED APPLICATION

This application is a continuation application of International Application PCT/CN2020/121045 filed on Oct. 15, 2020 and designated the U.S., the entire contents of which are incorporated herein by reference.

FIELD

This disclosure relates to the field of communications.

BACKGROUND

In order to alleviate increasingly tense spectrum resources, NR (New Radio) introduced a high-frequency communication mode to increase available frequency resources of the communication system, thus improving the system capacity.

NR Release 15 introduces a method for indicating QCL (quasi-collocation) parameters of PDCCHs (physical downlink control channels). Generally speaking, QCL parameters of an antenna port of a PDCCH DM-RS (demodulation reference signal) in a CORESET (control resource set) are indicated by RRC (radio resource control) signaling and MAC-CE (media access control-control element) signaling. Specifically, if a CORESET corresponding to a PDCCH is configured with more than one TCI (transmission configuration indicator) states via RRC signaling (tci-StatesPDCCH-ToAddList or tci-StatesPDCCH-ToReleaseList), an MAC-CE may be used to activate one of the TCI states. After the TCI state is activated, the antenna port of the DM-RS of the PDCCH and the reference signal corresponding to the activated TCI state are QCL-ed (quasi-collocated).

NR Release 15 also introduces a method for indicating QCL parameters of a PDSCH (physical downlink shared channel). Generally speaking, for dynamic scheduling, there are two methods for indicating the QCL parameters of PDSCH: if a scheduling DCI format (downlink control information format) of a PDSCH includes a TCI field, the QCL parameters of the PDSCH are determined by a TCI state indicated by the TCI field of the DCI format; and if a scheduling DCI format of a PDSCH does not include a TCI field, the QCL parameters of the PDSCH are determined by a TCI state or QCL assumption applied by a CORESET for receiving the DCI format (PDCCH).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that an NR system supports a central transmission frequency up to 52.6 GHz. In a high-frequency scenario, signals are easily blocked due to their poor diffraction abilities. Such channel quality degradation resulted from blockage is very unfavorable for URLLC (ultra reliable low latency communications) services. This is because decades of milliseconds are needed at the fasted speed to recover a communication link according to an existing beam failure recovery mechanism, while communication latency requirement of the URLLC is far less than decades of milliseconds. In case of being blocked, a channel corresponding to a high-frequency downlink may possibly become poor instantly. However, the existing recovery mechanism needs too long time, and is unable to meet latency requirement of URLLC services.

In order to reduce the impact of the blockage on a downlink, especially on downlink control information, a feasible way is to enable the downlink control information to be transmitted in a spatial diversity manner. That is, the same downlink control information may reach a UE (user equipment) via different spatial domain paths or different TRPs (transmission and reception points). In this way, when one path is blocked, other paths may still work, thereby ensuring low latency and high reliability of the downlink control information.

However, when one piece of downlink control information is associated with two TCI states (that is, it experiences two different spatial domain paths at the same time) and the downlink control information does not include a TCI field, a TCI state associated with a channel (or a signal) triggered by the downlink control information cannot be determined in the existing mechanism. More specifically, in this case, the downlink control information is associated with two TCI states, while an existing technique is unable to determine a relationship between the two TCI states associated with the downlink control information and TCI states associated with the PDSCH scheduled by the downlink control information.

In order to solve the above problems or other similar problems, embodiments of this disclosure provide a wireless communication method and apparatus and a system, so as to avoid the problem of degradation of system performance resulted from uncertainty of a TCI state of a channel or a signal.

According to an aspect of the embodiments of this disclosure, there is provided a wireless communication method, including:

a terminal equipment receives control information, the control information triggering a channel or a signal, reception or monitoring of the control information being related to two TCI states, and a DCI format corresponding to the control information including no TCI field; and the terminal equipment transmits or receive the channel or the signal according to the two TCI states or according to one of the two TCI states.

According to another aspect of the embodiments of this disclosure, there is provided a wireless communication method, including:

a network device transmits control information, the control information being related to two TCI states, and a DCI format corresponding to the control information including a TCI field.

According to a further aspect of the embodiments of this disclosure, there is provided a wireless communication method, including:

a terminal equipment receives control information, the control information being related to two TCI states, and a DCI format corresponding to the control information including a TCI field.

According to still another aspect of the embodiments of this disclosure, there is provided a wireless communication apparatus, including:

a receiving unit configured to receive control information, the control information triggering a channel or a signal, reception or monitoring of the control information being related to two TCI states, and a DCI format corresponding to the control information including no TCI field; and a processing unit configured to transmit or receive the channel or the signal according to the two TCI states or according to one of the two TCI states.

According to yet another aspect of the embodiments of this disclosure, there is provided a wireless communication apparatus, including:

a transmitting unit configured to transmit control information, the control information being related to two TCI states, and a DCI format corresponding to the control information including a TCI field.

According to yet still another aspect of the embodiments of this disclosure, there is provided a wireless communication apparatus, including:

a receiving unit configured to receive control information, the control information being related to two TCI states, and a DCI format corresponding to the control information including a TCI field.

An advantage of the embodiments of this disclosure exists in that on the one hand, when a piece of control information (excluding a TCI field) triggers a channel or a signal, a TCI state of the channel or the signal is determined by a TCI state associated with the control information. In this method, a mapping relationship between two TCI states associated with the control information and the TCI state of the signal or channel may be determined, so as to avoid uncertainty of the TCI state of the channel or the signal, and the method may lower overhead caused by indicating the TCI state of the channel or the signal in the control information. On the other hand, when a piece of control information triggers a channel or a signal, if the control information is associated with two TCI states, the control information includes a TCI field. In this method, the above control information is enabled to always include the TCI field, and the TCI state of the signal or channel triggered by the control information is indicated by the TCI field included therein, thus clarifying the TCI state of the signal or channel, and making indication of the TCI state of the signal or channel more flexible.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 1 is schematic diagram of the wireless communication method of an embodiment of a first aspect of this disclosure;

FIG. 9 is a schematic diagram of the wireless communication method of an embodiment of a second aspect of this disclosure;

FIG. 12 is a schematic diagram of the wireless communication method of an embodiment of a third aspect of this disclosure;

DETAILED DESCRIPTION

Figure 2:
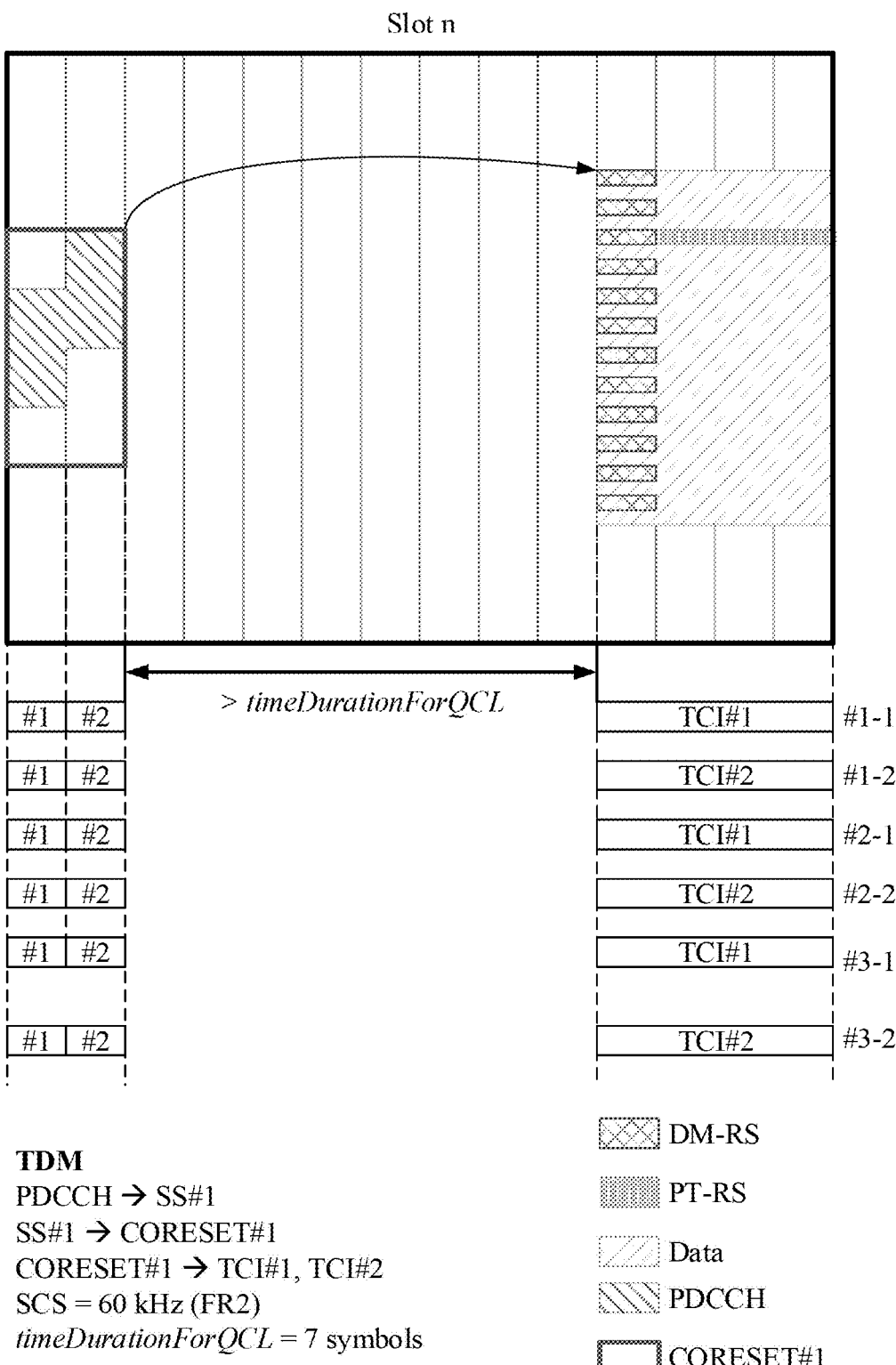
FIG. 2 is a schematic diagram of a mapping relationship between a TCI state of a PDCCH and a TCI state of a single-TCI PDSCH scheduled by the PDCCH.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Various embodiments of this disclosure shall be described below with reference to the accompanying drawings. These embodiments are illustrative only and are not intended to limit this disclosure.

Embodiment of a First Aspect

The embodiment of this disclosure provides a wireless communication method, which shall be described from a side of a terminal equipment.

FIG. 1 is schematic diagram of the wireless communication method of the embodiment of this disclosure. Referring to FIG. 1, the method includes:

101: a terminal equipment receives control information, the control information triggering a channel or a signal, reception or monitoring of the control information being related to two TCI states, and a DCI format corresponding to the control information including no TCI field; and

102: the terminal equipment transmits or receives the channel or the signal according to the two TCI states or according to one of the two TCI states.

According to the method of the embodiments of this disclosure, when a piece of control information (excluding a TCI field) triggers a channel or a signal, a TCI state of the channel or the signal is determined by a TCI state associated with the control information. Hence, this method may determine a mapping relationship between two TCI states associated with the control information and the TCI state of the signal or channel, so as to avoid uncertainty of the TCI state of the channel or the signal, and the method may lower overhead caused by indicating the TCI state of the channel or the signal in the control information.

In the embodiment of this disclosure, the above channel or the above signal is related to at least one of the above two TCI states. Therefore, the terminal equipment may transmit or receive the channel or the signal according to the two TCI states or according to one of the two TCI states.

For example, one of the above two TCI states is a first TCI state indicated by an MAC-CE command in a TCI state of a control resource set (CORESET) used for receiving or monitoring the above control information. The terminal equipment transmits or receives the channel or the signal according to the first TCI state. In this embodiment, the TCI state of the channel or the signal triggered by the above control information is determined via the first TCI state indicated by the MAC-CE signaling. Thus, the TCI state of the above channel or the signal may be changed flexibly.

For another example, one of the above two TCI states is a TCI state with a lowest ID in TCI states of the control resource set (CORESET) used for receiving or monitoring the above control information. The terminal equipment transmits or receives the above channel or the above signal according to the TCI state with the lowest ID. In this embodiment, the TCI state(s) of the channel/signal triggered by the above control information is/are determined via the TCI state with the lowest ID. Therefore, the TCI state of the above channel or the above signal may be directly determined via the ID of the TCI state, thereby avoiding additional signaling overhead.

For a further example, one of the above two TCI states is a TCI state applied by a first control resource set in two control resource sets used for receiving or monitoring above control information indicated by RRC signaling. The terminal equipment transmits or receives the above channel or the above signal according to the TCI state. In this embodiment, the TCI state of the channel or the signal triggered by the above control information is determined via the TCI state of the first CORESET indicated by the RRC signaling. Thus, the TCI state of the above channel or the above signal may be changed flexibly.

For still another example, one of the above two TCI states is a TCI state applied by a control resource set with a lowest ID in two control resource sets used for receiving or monitoring the above control information. The terminal equipment transmits or receives the above channel or the above signal according to the TCI state. In this embodiment, the TCI state of the channel or the signal triggered by the above control information is determined via the TCI state of the CORESET with the lowest ID. Therefore, the TCI state of the above channel or the above signal may be directly determined via the ID of the CORESET, thereby avoiding additional signaling overhead.

For yet another example, one of the above two TCI states is a TCI state corresponding to a first search space set in two search space sets used for receiving or monitoring the above control information indicated by RRC signaling. The terminal equipment transmits or receives the above channel or the above signal according to the TCI state. In this embodiment, the TCI state of the channel or the signal triggered by the above control information is determined via the TCI state of the first search space set indicated by the RRC signaling. Thus, the TCI state of the above channel or the above signal may be changed flexibly.

For yet still another example, one of the above two TCI states is a TCI state corresponding to a search space set with a lowest ID in two search space sets used t for receiving or monitoring the above control information. The terminal equipment transmits or receives the above channel or the above signal according to the TCI state. In this embodiment, the TCI state of the channel or the signal triggered by the above control information is determined via the TCI state of the search space set with the lowest ID. Therefore, the TCI state of the above channel or the above signal may be directly determined via the ID of the associated search space set, thereby avoiding additional signaling overhead.

For further still another example, one of the above two TCI states is a TCI state applied by a time-frequency resource used for receiving or monitoring the above control information. The terminal equipment transmits or receives the above channel or the above signal according to the TCI state. In this embodiment, the TCI state of the channel or the signal triggered by the control information is determined by the time-frequency resource corresponding to receiving or monitoring the above control information. Therefore, the TCI state of the above channel or the above signal may be directly determined via the above time-frequency resource, thereby avoiding additional signaling overhead.

In this example, the time-frequency resource used for receiving or monitoring the control information may be an earliest symbol used for receiving or monitoring the control information, may also be a PRB (physical resource block) with a lowest index used for receiving or monitoring of the control information, and may also be a PRB with a lowest index within an earliest symbol used for receiving or monitoring the control information; however, this disclosure is not limited thereto.

In the embodiments of this disclosure, in some embodiments, the above channel or the above signal is a downlink channel or a downlink signal, such as a PDSCH or a CSI-RS (channel state information-reference signal); in some embodiments, the above channel or the above signal is an uplink channel or an uplink signal, such as a PUSCH (physical uplink shared channel), a PUCCH (physical uplink control channel), and/or an SRS (sounding reference signal).

Taking that the above channel or the above signal is a PDSCH as an example, in some embodiments, the PDSCH is related to a first TCI state, and the first TCI state may be at least one of the following:

a first TCI state indicated by an MAC-CE command in TCI states of a control resource set (CORESET) used for receiving or monitoring the control information;

a TCI state of a lowest ID in TCI states of a control resource set (CORESET) used for receiving or monitoring the control information;

a TCI state applied by a first control resource set indicated by RRC signaling in two control resource sets used for receiving or monitoring the control information;

a TCI state applied by a control resource set of a lowest ID in two control resource sets used for receiving or monitoring the control information;

a TCI state corresponding to a first search space set indicated by RRC signaling in two search space sets used for receiving or monitoring the control information;

a TCI state corresponding to a search space set of a lowest ID in two search space sets used for receiving or monitoring the control information; or a TCI state applied by a time frequency resource used for receiving or monitoring the control information.

In the above embodiment, the time frequency resource used for receiving or monitoring the control information may be an earliest symbol used for receiving or monitoring the control information, or a PRB of a lowest index used for receiving or monitoring the control information, or a PRB of a lowest index in an earliest symbol used for receiving or monitoring the control information; however, this disclosure is not limited thereto.

In the above embodiment, in some embodiments, the PDSCH is also related to a second TCI state, the second TCI state may be a TCI state in the above two TCI states other than the first TCI state.

For example, assuming that the first TCI state is a first TCI state in the TCI states of the control resource set (CORESET) used for receiving or monitoring the above control information indicated by the MAC-CE command, the second TCI state is a second TCI state indicated by the MAC-CE command.

For another example, assuming that the first TCI state is a TCI state with a lowest ID in the TCI states of the control resource set (CORESET) used for receiving or monitoring the above control information, the second TCI state is a TCI state with a highest ID in the TCI states of the control resource set (CORESET) used for receiving or monitoring the above control information, and so on, which shall not be described herein any further.

In the embodiment of this disclosure, in some embodiments, the above channel or the above signal is related to two TCI states, such as in a scenario of multi-TRP PDSCHs.

In the embodiment of this disclosure, according to the RRC signaling or a DCI field of the above DCI format, the terminal equipment may determine whether to transmit or receive the above channel or the above signal according to the above two TCI states or transmit or receive the above channel or the above signal according to one of the above two TCI states. For example, the above RRC signaling is used to indicate whether the above channel or the above signal is related to one TCI state or two TCI states. In some embodiments, the DCI field of the above DCI format may be a TDRA (time domain resource allocation) field of the above DCI format; however, this disclosure is not limited thereto.

In the embodiment of this disclosure, a time offset between the above control information and the above channel or the above signal is greater than or equal to a predetermined time period, for example, the above time offset is greater than or equal to timeDurationForQCL. Therefore, the terminal equipment may determine QCL parameters of the above channel or the above signal according to QCL parameters associated with the above control information. Reference may be made to relevant techniques for a definition of timeDurationForQCL, which shall not be repeated herein any further.

The method of the embodiment of this disclosure shall be described below by way of examples.

FIG. 2 is a schematic diagram of a mapping relationship between a TCI state of a PDCCH and a TCI state of a single-TCI PDSCH scheduled by the PDCCH.

As shown in FIG. 2, the UE receives a PDCCH (control information) associated with two TCI states at a slot n, the PDCCH scheduling a PDSCH (channel or signal). A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH does not include a TCI field; a search space corresponding to the PDCCH is SS #1; a CORESET corresponding to search space SS #1 is CORESET #1; two TCI states of CORESET #1 are activated by MAC-CE activation signaling, i.e., TCI #1 and TCI #2, wherein a first TCI state activated by the MAC-CE activation signaling is TCI #1, and a second TCI state activated by the MAC-CE activation signaling is TCI #2; in addition, a TCI state applied by a first symbol in slot n is TCI #1, and a TCI state applied by a second symbol in slot n is TCI #2.

In this example, according to the method in the embodiment of this disclosure, the UE may determine that the PDSCH is associated with a TCI state according to method 1 or method 2 below:

method 1: before the UE receives the PDCCH and PDSCH, the UE receives RRC signaling, and the UE determines that the PDSCH is associated with a TCI state according to the RRC signaling;

method 2: the UE determines that the PDSCH is associated with a TCI state according to a TDRA field in a DCI format corresponding to the PDCCH.

In this example, according to the method in the embodiment of this disclosure, the UE may determine the TCI state of the PDSCH according to methods as below.

Method 1-1: the TCI state of the PDSCH is determined according to the first TCI state used for receiving the PDCCH. For example, the reception of the PDCCH is based on the TCI state of CORESET #1 corresponding to the PDCCH, and the TCI state of the PDSCH is determined by the first TCI state (TCI #1) activated by the MAC-CE for CORESET #1.

Method 1-2: the TCI state of the PDSCH is determined according to the second TCI state for receiving the PDCCH. For example, the reception of the PDCCH is based on the TCI state of CORESET #1 corresponding to the PDCCH, and the TCI state of the PDSCH is determined by the second TCI state (TCI #2) activated by the MAC-CE for CORESET #1.

Method 2-1: the TCI state of the PDSCH is determined according to the TCI state of a lowest ID used for receiving the PDCCH. For example, the reception of the PDCCH is based on the TCI state of CORESET #1 corresponding to the PDCCH, and the TCI state of the PDSCH is determined by the TCI state (TCI #1) with the lowest ID activated by the MAC-CE for CORESET #1.

Method 2-2: the TCI state of the PDSCH is determined according to the TCI state of a maximum ID used for receiving the PDCCH. For example, the reception of the PDCCH is based on the TCI state of CORESET #1 corresponding to the PDCCH, and the TCI state of the PDSCH is determined by the TCI state (TCI #2) with the maximum ID activated by the MAC-CE for CORESET #1.

Method 3-1: the TCI state of the PDSCH is determined according to a TCI state applied by an earliest symbol used for receiving the PDCCH. For example, the earliest symbol for receiving the PDCCH is a first symbol in slot n, and the TCI state of the PDSCH is determined by the TCI state (TCI #1) applied by the PDCCH on the symbol.

Method 3-2: the TCI state of the PDSCH is determined according to a TCI state applied by a latest symbol used for receiving the PDCCH. For example, the latest symbol for receiving the PDCCH is a second symbol in slot n, and the TCI state of the PDSCH is determined by the TCI state (TCI #2) applied by the PDCCH on the symbol.

Figure 3:
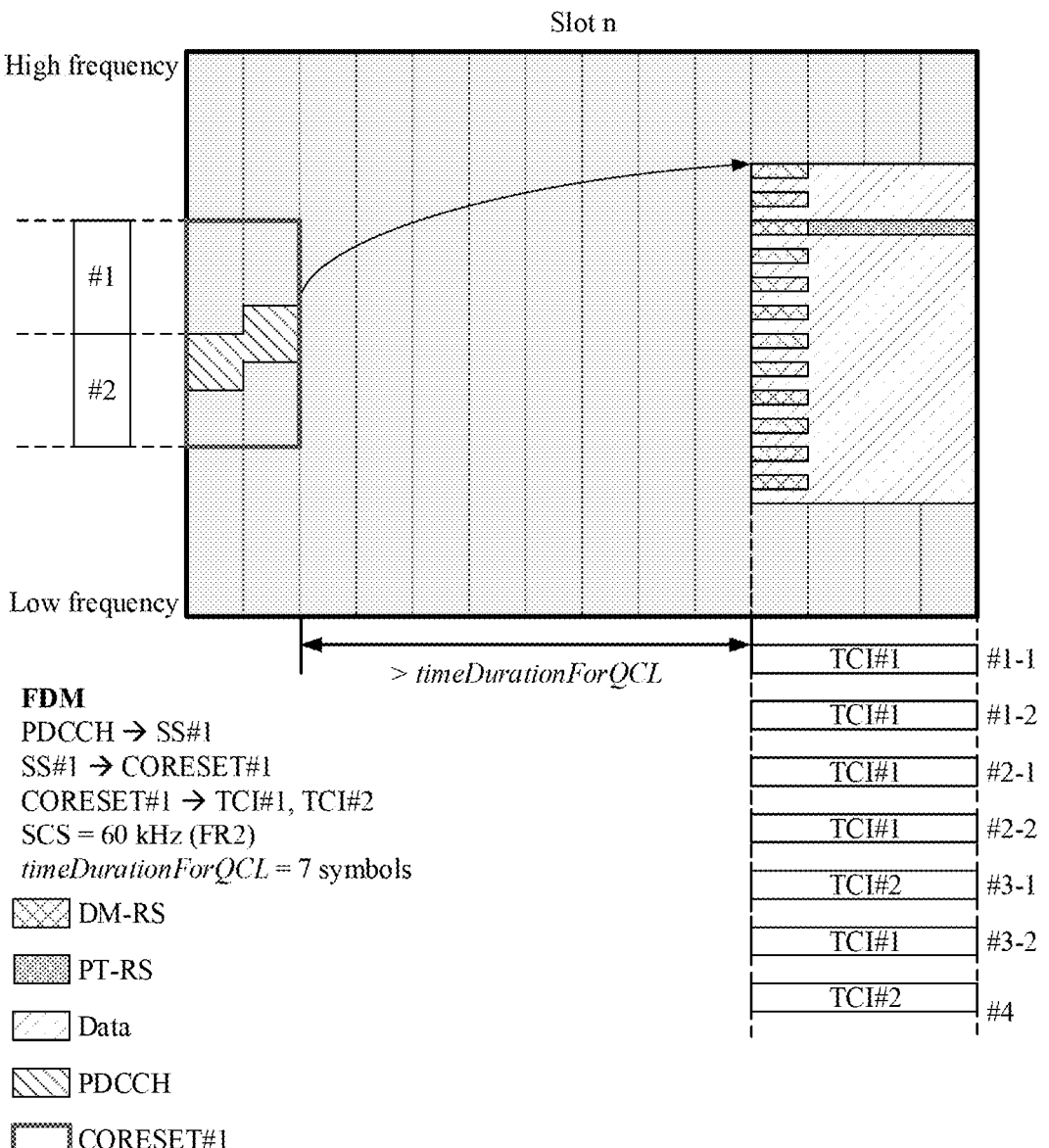
FIG. 3 is another schematic diagram of the mapping relationship between a TCI state of a PDCCH and a TCI state of a single-TCI PDSCH scheduled by the PDCCH.

FIG. 3 is another schematic diagram of the mapping relationship between a TCI state of a PDCCH and a TCI state of a single-TCI PDSCH scheduled by the PDCCH.

As shown in FIG. 3, the UE receives a PDCCH (control information) at slot n, and the PDCCH schedules a PDSCH (channel or signal). A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH does not include a TCI field; a search space corresponding to the PDCCH is SS #1, and a CORESET corresponding to search space SS #1 is CORESET #1, and two TCI states of CORESET #1 are activated by MAC-CE activation signaling, i.e., TCI #1 and TCI #2, wherein a first TCI state activated by the MAC-CE activation signaling is TCI #1, and a second TCI state activated by the MAC-CE activation signaling is TCI #2; in addition, for CORESET #1, its frequency domain resources are divided into two parts, in which a TCI state applied by a part with a higher frequency is TCI #1, and a TCI state applied by a part with a lower frequency is TCI #2.

In this example, according to the method in the embodiment of this disclosure, the UE may determine that the PDSCH is associated with a TCI state according to method 1 or method 2 below:

method 1: before the UE receives the PDCCH and PDSCH, the UE receives RRC signaling, and the UE determines that the PDSCH is associated with a TCI state according to the RRC signaling;

method 2: the UE determines that the PDSCH is associated with a TCI state according to a TDRA field in a DCI format corresponding to the PDCCH.

In this example, according to the method in the embodiment of this disclosure, the UE may determine the TCI state of the PDSCH according to methods as below.

Method 1-1: the TCI state of the PDSCH is determined according to the first TCI state used for receiving the PDCCH. For example, the reception of the PDCCH is based on the TCI state of CORESET #1 corresponding to the PDCCH, and the TCI state of the PDSCH is determined by the first TCI state (TCI #1) activated by the MAC-CE for CORESET #1.

Method 1-2: the TCI state of the PDSCH is determined according to the second TCI state for receiving the PDCCH. For example, the reception of the PDCCH is based on the TCI state of CORESET #1 corresponding to the PDCCH, and the TCI state of the PDSCH is determined by the second TCI state (TCI #2) activated by the MAC-CE for CORESET #1.

Method 2-1: the TCI state of the PDSCH is determined according to the TCI state of a lowest ID used for receiving the PDCCH. For example, the reception of the PDCCH is based on the TCI state of CORESET #1 corresponding to the PDCCH, and the TCI state of the PDSCH is determined by the TCI state (TCI #1) with the lowest ID activated by the MAC-CE for CORESET #1.

Method 2-2: the TCI state of the PDSCH is determined according to the TCI state of a maximum ID used for receiving the PDCCH. For example, the reception of the PDCCH is based on the TCI state of CORESET #1 corresponding to the PDCCH, and the TCI state of the PDSCH is determined by the TCI state (TCI #2) with the maximum ID activated by the MAC-CE for CORESET #1.

Method 3-1: the TCI state (TCI #1) of the PDSCH is determined according to a TCI state (TCI #1) applied by a PRB with a highest frequency (such as a PRB with a highest ID) in frequency-domain resources used for receiving the PDCCH.

Method 3-2: the TCI state (TCI #2) of the PDSCH is determined according to a TCI state (TCI #2) applied by a PRB with a lowest frequency (such as a PRB with a lowest ID) in frequency-domain resources used for receiving the PDCCH.

Method 4: the TCI state (TCI #2) of the PDSCH is determined according to a TCI state (TCI #2) applied by a PRB with a lowest frequency (such as a PRB with a lowest ID) in an earliest symbol in time-frequency resources for receiving the PDCCH. For example, the earliest symbol for receiving the PDCCH is a first symbol in slot n, and the TCI state of the PDSCH is determined by the TCI state (TCI #2) applied by the PRB with the lowest frequency corresponding to the PDCCH on the symbol.

In the examples in FIG. 2 and FIG. 3, the PDCCH has no repetitions. In addition, FIG. 2 shows a case of time division multiplexing (TDM), and FIG. 3 shows a case of frequency division multiplexing (FDM).

Figure 4:
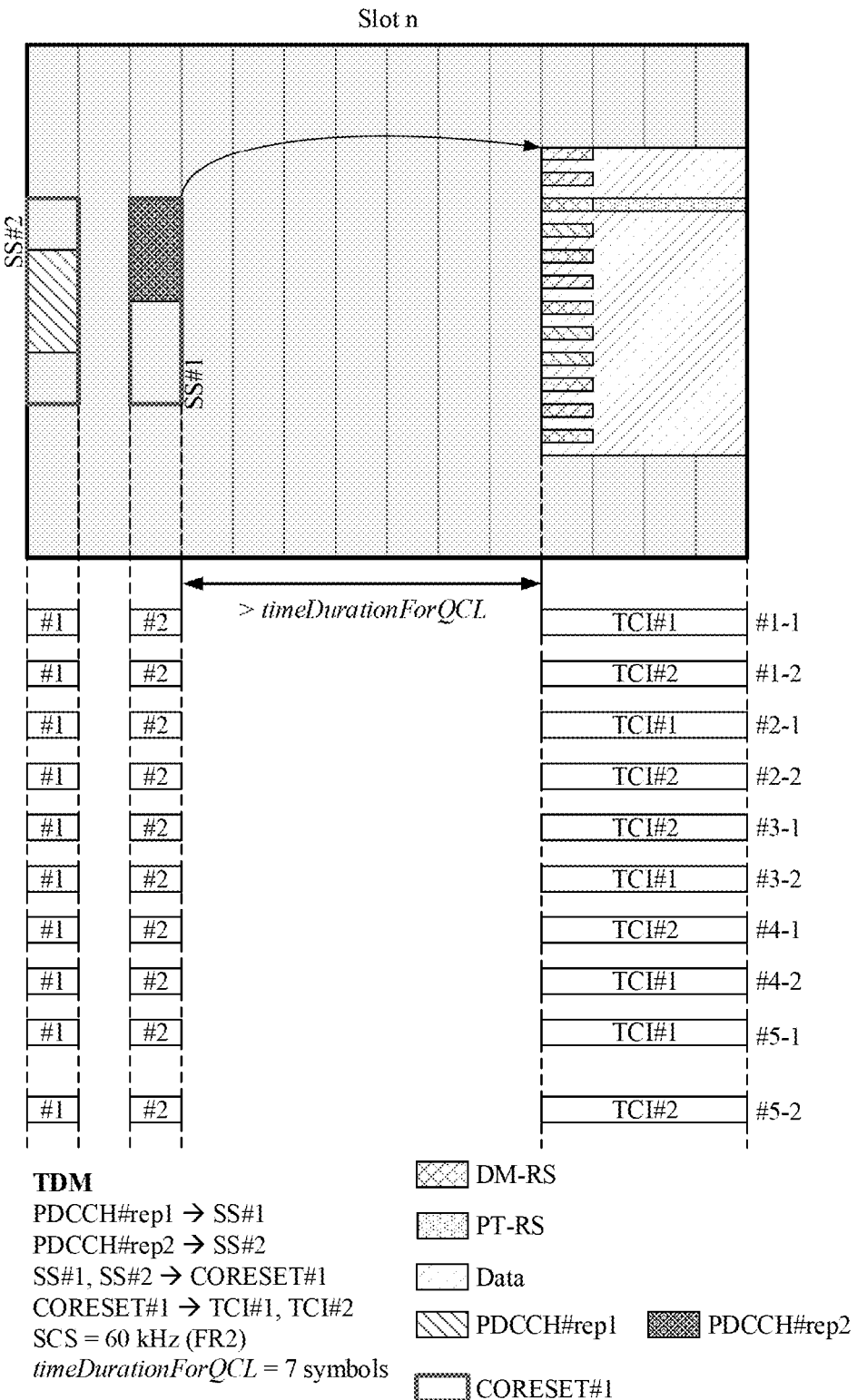
FIG. 4 is a further schematic diagram of the mapping relationship between a TCI state of a PDCCH and a TCI state of a single-TCI PDSCH scheduled by the PDCCH.

FIG. 4 is a further schematic diagram of the mapping relationship between a TCI state of a PDCCH and a TCI state of a single-TCI PDSCH scheduled by the PDCCH.

As shown in FIG. 4, the UE receives a PDCCH (control information) at slot n, and the PDCCH schedules a PDSCH (channel or signal). A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH does not include a TCI field; and the PDCCH includes two parts, PDCCH #rep1 and PDCCH #rep2, wherein PDCCH #rep1 and PDCCH #rep2 correspond to identical DCI bits; search spaces corresponding to the PDCCH are SS #1 and SS #2, respectively; where, SS #1 is located at a first symbol in slot n, and SS #2 is located at a third symbol in slot n. For example, UE learns in advance that SS #1 and SS #2 are associated, SS #1 corresponds to a first SS, and SS #2 corresponds to a second SS. Repetitions corresponding to a PDCCH may be respectively received on these two SSs; according to configuration of RRC signaling, CORESETs corresponding to search spaces SS #1 and SS #2 are both CORESET #1, and two TCI states of CORESET #1, i.e., TCI #1 and TCI #2, are activated by MAC-CE activation signaling, wherein a first TCI state activated by the MAC-CE activation signaling is TCI #1, where, SS #2 corresponds to TCI #1, and a second TCI state activated by the MAC-CE activation signaling is TCI #2, where, SS #1 corresponds to TCI #2; in addition, a TCI state applied at a first symbol in slot n is TCI #1, and a TCI state applied at a third symbol in slot n is TCI #2.

In this example, according to the method in the embodiment of this disclosure, the UE may determine that the PDSCH is associated with a TCI state according to method 1 or method 2 below:

method 1: before the UE receives the PDCCH and PDSCH, the UE receives RRC signaling, and the UE determines that the PDSCH is associated with a TCI state according to the RRC signaling;

method 2: the UE determines that the PDSCH is associated with a TCI state according to a TDRA field in a DCI format corresponding to the PDCCH.

In this example, according to the method in the embodiment of this disclosure, the UE may determine the TCI state of the PDSCH according to methods as below.

Method 1-1: the TCI state of the PDSCH is determined according to a first TCI state used for monitoring the PDCCH. For example, the monitoring of the PDCCH is based on one of the two TCI states of CORESET #1 corresponding to the PDCCH, and the TCI state of the PDSCH is determined by the first TCI state (TCI #1) activated by the MAC-CE for CORESET #1.

Method 1-2: the TCI state of the PDSCH is determined according to a second TCI state used for monitoring the PDCCH. For example, the monitoring of the PDCCH is based on one of the two TCI states of CORESET #1 corresponding to the PDCCH, and the TCI state of the PDSCH is determined by the second TCI state (TCI #2) activated by the MAC-CE for CORESET #1.

Method 2-1: the TCI state of the PDSCH is determined according to a TCI state of a lowest ID used for monitoring the PDCCH. For example, the monitoring of the PDCCH is based on one of the two TCI states of CORESET #1 corresponding to the PDCCH, and the TCI state of the PDSCH is determined by the TCI state (TCI #1) with the lowest ID activated by the MAC-CE for CORESET #1.

Method 2-2: the TCI state of the PDSCH is determined according to a TCI state of a maximum ID used for monitoring the PDCCH. For example, the monitoring of the PDCCH is based on one of the two TCI states of CORESET #1 corresponding to the PDCCH, and the TCI state of the PDSCH is determined by the TCI state (TCI #2) with the maximum ID activated by the MAC-CE for CORESET #1.

Method 3-1: the TCI state of the PDSCH is determined according to a TCI state of a first SS used for monitoring the PDCCH. For example, the monitoring of the PDCCH is based on one of the two SSs corresponding to the PDCCH, and the TCI state of the PDSCH is determined by the TCI state (TCI #1) of the first SS (SS #1) activated by the MAC-CE for CORESET #1.

Method 3-2: the TCI state of the PDSCH is determined according to a TCI state of a second SS used for monitoring the PDCCH. For example, the monitoring of the PDCCH is based on one of the two SSs corresponding to the PDCCH, and the TCI state of the PDSCH is determined by the TCI state (TCI #2) of the second SS (SS #2) activated by the MAC-CE for CORESET #1.

Method 4-1: the TCI state of the PDSCH is determined according to a TCI state of an SS of a lowest ID used for monitoring the PDCCH. For example, the monitoring of the PDCCH is based on one of the two SSs corresponding to the PDCCH, and the TCI state of the PDSCH is determined by the TCI state (TCI #1) used for the SS with the lowest ID (SS #1) activated by the MAC-CE for CORESET #1.

Method 4-2: the TCI state of the PDSCH is determined according to a TCI state of an SS of a maximum ID used for monitoring the PDCCH. For example, the monitoring of the PDCCH is based on one of the two SSs corresponding to the PDCCH, and the TCI state of the PDSCH is determined by the TCI state (TCI #2) used for the SS with the maximum ID (SS #2) activated by the MAC-CE for CORESET #1.

Method 5-1: the TCI state of the PDSCH is determined according to a TCI state (TCI #1) applied by an earliest symbol used for monitoring the PDCCH. For example, the earliest symbol corresponding to the monitoring of the PDCCH is a first symbol in slot n, and the TCI state of the PDSCH is determined by the TCI state applied by the PDCCH on the symbol.

Method 5-2: the TCI state of the PDSCH is determined according to a TCI state (TCI #2) applied by a latest symbol used for monitoring the PDCCH. For example, the latest symbol corresponding to the monitoring of the PDCCH is a third symbol in slot n, and the TCI state of the PDSCH is determined by the TCI state applied by the PDCCH on the symbol.

Figure 5:
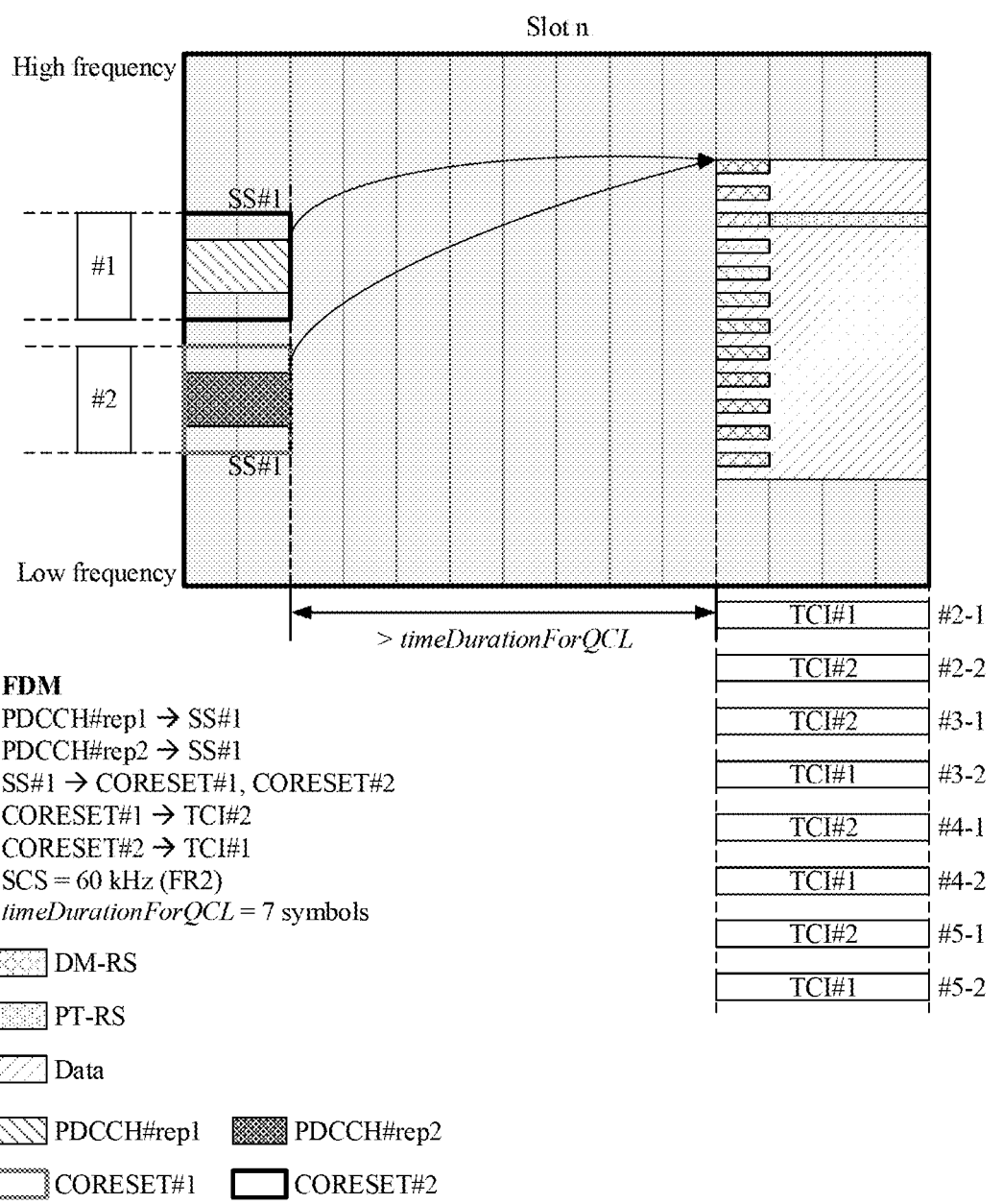
FIG. 5 is still another schematic diagram of the mapping relationship between a TCI state of a PDCCH and a TCI state of a single-TCI PDSCH scheduled by the PDCCH.

FIG. 5 is still another schematic diagram of the mapping relationship between a TCI state of a PDCCH and a TCI state of a single-TCI PDSCH scheduled by the PDCCH.

As shown in FIG. 5, the UE receives a PDCCH (control information) at slot n, and the PDCCH schedules a PDSCH (channel or signal). A scheduling offset between the PDCCH and the PDSCH is greater than or equal to timeDuration-ForQCL. In this example, assuming SCS=60 kHz, a corresponding UE capability timeDurationForQCL is of 7 symbols.

In addition, a DCI format corresponding to the PDCCH does not include a TCI field; and the PDCCH includes two parts, PDCCH #rep1 and PDCCH #rep2, wherein PDCCH #rep1 and PDCCH #rep2 correspond to identical DCI bits;

a search space corresponding to the PDCCH is SS #1; according to configuration of RRC signaling, the search space SS #1 corresponds to CORESET #1 and CORESET #2. for example, the UE learns in advance that CORESET #1 and CORESET #2 are associated, CORESET #1 corresponds to TCI #2, and CORESET #2 corresponds to TCI #1.

In this example, according to the method in the embodiment of this disclosure, the UE may determine that the PDSCH is associated with a TCI state according to method 1 or method 2 below:

method 1: before the UE receives the PDCCH and PDSCH, the UE receives RRC signaling, and the UE determines that the PDSCH is associated with a TCI state according to the RRC signaling;

method 2: the UE determines that the PDSCH is associated with a TCI state according to a TDRA field in a DCI format corresponding to the PDCCH.

In this example, according to the method in the embodiment of this disclosure, the UE may determine the TCI state of the PDSCH according to methods as below.

Method 2-1: the TCI state of the PDSCH is determined according to a TCI state of a lowest ID used for monitoring the PDCCH. For example, the monitoring of the PDCCH is based on one of the two TCI states of CORESET #1 and CORESET #2 corresponding to the PDCCH, and the TCI state of the PDSCH is determined by the TCI state (TCI #1) with the lowest ID activated by the MAC-CE for CORESET #1 and CORESET #2.

Method 2-2: the TCI state of the PDSCH is determined according to a TCI state of a maximum ID used for monitoring the PDCCH. For example, the monitoring of the PDCCH is based on one of the two TCI states of CORESET #1 and CORESET #2 corresponding to the PDCCH, and the TCI state of the PDSCH is determined by the TCI state (TCI #2) with the maximum ID activated by the MAC-CE for CORESET #1 and CORESET #2.

Method 3-1: the TCI state of the PDSCH is determined according to a TCI state of a first CORESET used for monitoring the PDCCH. For example, the monitoring of the PDCCH is based on one of the two CORESETs corresponding to the PDCCH, and the TCI state of the PDSCH is determined by the TCI state (TCI #2) used for the first CORESET (CORESET #1).

Method 3-2: the TCI state of the PDSCH is determined according to a TCI state of a second CORESET used for monitoring the PDCCH. For example, the monitoring of the PDCCH is based on one of the two CORESETs corresponding to the PDCCH, and the TCI state of the PDSCH is determined by the TCI state (TCI #1) used for the second CORESET (CORESET #2).

Method 4-1: the TCI state of the PDSCH is determined according to a TCI state of a CORESET of a lowest ID used for monitoring the PDCCH. For example, the monitoring of the PDCCH is based on one of the two CORESETs corresponding to the PDCCH, and the TCI state of the PDSCH is determined by the TCI state (TCI #2) used for the CORESET with the lowest ID (CORESET #1).

Method 4-2: the TCI state of the PDSCH is determined according to a TCI state of a CORESET of a maximum ID used for monitoring the PDCCH. For example, the monitoring of the PDCCH is based on one of the two CORESETs corresponding to the PDCCH, and the TCI state of the PDSCH is determined by the TCI state (TCI #1) used for the CORESET with the maximum ID (CORESET #2).

Method 5-1: the TCI state of the PDSCH is determined according to a TCI state (TCI #2) applied by a PRB with a lowest frequency (such as a PRB with a lowest ID) in frequency domain resources used for monitoring the PDCCH.

Method 5-2: the TCI state of the PDSCH is determined according to a TCI state (TCI #1) applied by a PRB with a highest frequency (such as a PRB with a highest ID) in frequency domain resources used for monitoring the PDCCH.

Figure 6:
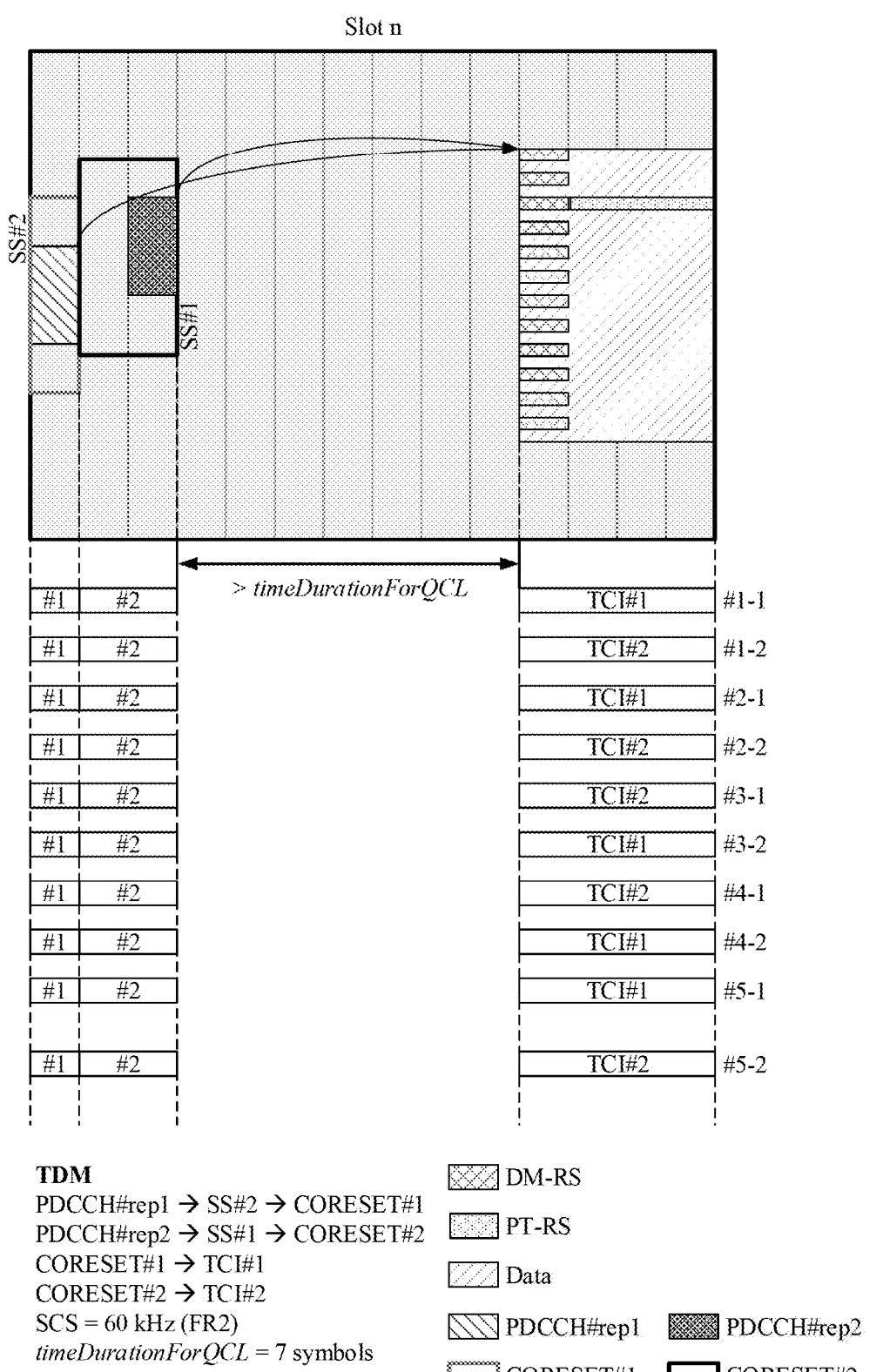
FIG. 6 is yet another schematic diagram of the mapping relationship between a TCI state of a PDCCH and a TCI state of a single-TCI PDSCH scheduled by the PDCCH.

FIG. 6 is yet another schematic diagram of the mapping relationship between a TCI state of a PDCCH and a TCI state of a single-TCI PDSCH scheduled by the PDCCH.

As shown in FIG. 6, the UE receives a PDCCH (control information) at slot n, and the PDCCH schedules a PDSCH (channel or signal). A scheduling offset between the PDCCH and the PDSCH is greater than or equal to timeDuration-ForQCL. In this example, assuming SCS=60 kHz, a corresponding UE capability timeDurationForQCL is of 7 symbols.

In addition, a DCI format corresponding to the PDCCH does not include a TCI field; and the PDCCH includes two parts, PDCCH #rep1 and PDCCH #rep2, wherein PDCCH #rep1 and PDCCH #rep2 correspond to identical DCI bits; search spaces corresponding to the PDCCH are SS #1 and SS #2, respectively, wherein SS #1 is located at a first symbol in slot n, and SS #2 is located at a third symbol in slot n. For example, UE learns in advance that SS #1 and SS #2 are associated, SS #1 corresponds to a first SS, and SS #2 corresponds to a second SS. Repetitions corresponding to a PDCCH may be respectively received on these two SSs; according to configuration of RRC signaling, search spaces SS #1 and SS #2 correspond respectively to CORESET #2 and CORESET #1; for example, the RRC signaling indicates that CORESET #1 corresponds to the first CORESET, and CORESET #2 corresponds to the second CORESET; and a TCI state applied at a first symbol in slot n is TCI #1, and a TCI state applied at a third symbol in slot n is TCI #2.

In this example, according to the method in the embodiment of this disclosure, the UE may determine that the PDSCH is associated with a TCI state according to method 1 or method 2 below:

method 1: before the UE receives the PDCCH and PDSCH, the UE receives RRC signaling, and the UE determines that the PDSCH is associated with a TCI state according to the RRC signaling;

method 2: the UE determines that the PDSCH is associated with a TCI state according to a TDRA field in a DCI format corresponding to the PDCCH.

In this example, according to the method in the embodiment of this disclosure, the UE may determine the TCI state of the PDSCH according to methods as below.

Method 1-1: the TCI state of the PDSCH is determined according to a first TCI state used for monitoring the PDCCH. For example, the monitoring of the PDCCH is based on one of the two TCI states of CORESET #1 corresponding to the PDCCH, and the TCI state of the PDSCH is determined by the first TCI state (TCI #1) activated by the MAC-CE for CORESET #1.

Method 1-2: the TCI state of the PDSCH is determined according to a second TCI state used for monitoring the PDCCH. For example, the monitoring of the PDCCH is based on one of the two TCI states of CORESET #1 corresponding to the PDCCH, and the TCI state of the PDSCH is determined by the second TCI state (TCI #2) activated by the MAC-CE for CORESET #1.

Method 2-1: the TCI state of the PDSCH is determined according to a TCI state of a lowest ID used for monitoring the PDCCH. For example, the monitoring of the PDCCH is based on one of the two TCI states of CORESET #1 corresponding to the PDCCH, and the TCI state of the PDSCH is determined by the TCI state (TCI #1) with the lowest ID activated by the MAC-CE for CORESET #1.

Method 2-2: the TCI state of the PDSCH is determined according to a TCI state of a maximum ID used for monitoring the PDCCH. For example, the monitoring of the PDCCH is based on one of the two TCI states of CORESET #1 corresponding to the PDCCH, and the TCI state of the PDSCH is determined by the TCI state (TCI #2) with the maximum ID activated by the MAC-CE for CORESET #1.

Method 3-1: the TCI state of the PDSCH is determined according to a TCI state of a first CORESET used for monitoring the PDCCH. For example, the monitoring of the PDCCH is based on the first CORESET of the two CORESETs corresponding to the PDCCH, and the TCI state of the PDSCH is determined by the TCI state (TCI #1) applied by CORESET #1.

Method 3-2: the TCI state of the PDSCH is determined according to a TCI state of a second CORESET used for monitoring the PDCCH. For example, the monitoring of the PDCCH is based on the second CORESET of the two CORESETs corresponding to the PDCCH, and the TCI state of the PDSCH is determined by the TCI state (TCI #2) applied by CORESET #2.

Method 4-1: the TCI state of the PDSCH is determined according to a TCI state of a CORESET of a lowest ID used for monitoring the PDCCH. For example, the monitoring of the PDCCH is based on a CORESET with a smaller ID in the two CORESETs corresponding to the PDCCH, and the TCI state of the PDSCH is determined by the TCI state (TCI #1) applied by CORESET #1.

Method 4-2: the TCI state of the PDSCH is determined according to a TCI state of a CORESET of a maximum ID used for monitoring the PDCCH. For example, the monitoring of the PDCCH is based on a CORESET with a larger ID in the two CORESETs corresponding to the PDCCH, and the TCI state of the PDSCH is determined by the TCI state (TCI #2) applied by CORESET #2.

Method 5-1: the TCI state of the PDSCH is determined according to a TCI state (TCI #1) applied by an earliest symbol used for monitoring the PDCCH. For example, the earliest symbol corresponding to the monitoring of the PDCCH is a first symbol in slot n, and the TCI state of the PDSCH is determined by the TCI state applied by the PDCCH on the symbol.

Method 5-2: the TCI state of the PDSCH is determined according to a TCI state (TCI #2) applied by a latest symbol used for monitoring the PDCCH. For example, the latest symbol corresponding to the monitoring of the PDCCH is a third symbol in slot n, and the TCI state of the PDSCH is determined by the TCI state applied by the PDCCH on the symbol.

In the examples in FIGS. 4-6, the PDCCH has repetitions. Moreover, in the example in FIG. 4, there are two search space sets and one CORESET, in the example in FIG. 5, there are one search space set and two CORESETs, and in the example in FIG. 6, there are two search space sets and two CORESETs.

Figure 7:
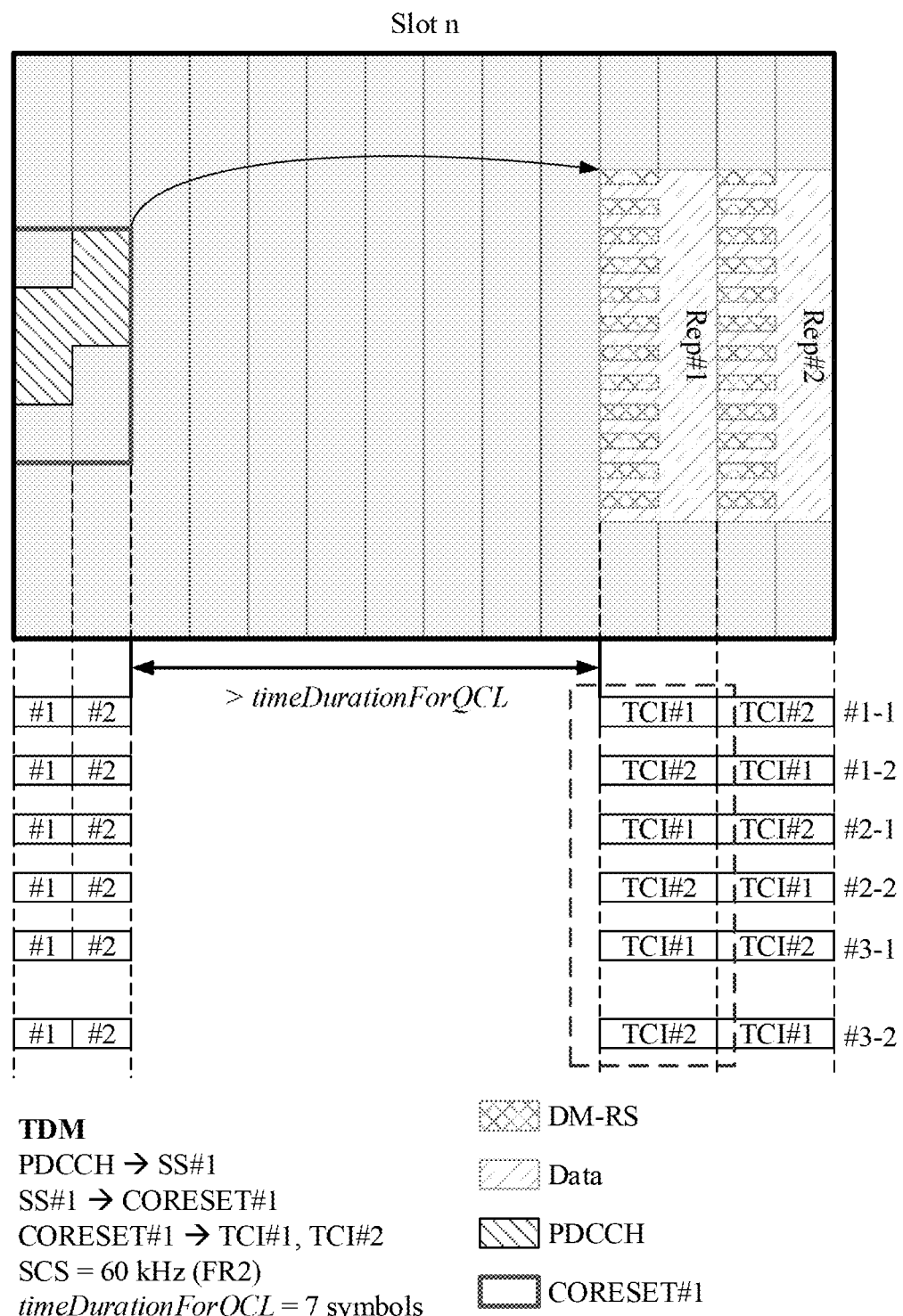
FIG. 7 is a schematic diagram of a mapping relationship between a TCI state of a PDCCH and a TCI state of a multi-TCI PDSCH scheduled by the PDCCH.

FIG. 7 is a schematic diagram of a mapping relationship between a TCI state of a PDCCH and a TCI state of a multi-TCI PDSCH scheduled by the PDCCH.

As shown in FIG. 7, the UE receives a PDCCH (control information) associated with two TCI states at a slot n, and the PDCCH schedules a PDSCH (channel or signal). A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH does not include a TCI field; a search space corresponding to the PDCCH is SS #1; a CORESET corresponding to search space SS #1 is CORESET #1; two TCI states of CORESET #1 are activated by MAC-CE activation signaling, i.e., TCI #1 and TCI #2, wherein a first TCI state activated by the MAC-CE activation signaling is TCI #1, and a second TCI state activated by the MAC-CE activation signaling is TCI #2; a TCI state applied at a first symbol in slot n is TCI #1, and a TCI state applied at a second symbol in slot n is TCI #2.

In this example, according to the method in the embodiment of this disclosure, the UE may determine that the PDSCH is associated with two TCI states according to method 1 or method 2 below:

method 1: before the UE receives the PDCCH and PDSCH, the UE receives RRC signaling, and the UE determines that the PDSCH is associated with two TCI states according to the RRC signaling;

method 2: the UE determines that the PDSCH is associated with two TCI states according to a TDRA field in a DCI format corresponding to the PDCCH.

In this example, according to the method in the embodiment of this disclosure, the UE may determine a TCI state of Rep #1 of the PDSCH according to methods as below.

Method 1-1: the TCI state of Rep #1 of the PDSCH is determined according to the first TCI state used for receiving the PDCCH. For example, reception of the PDCCH is based on the TCI state of CORESET #1 corresponding to the PDCCH, and the TCI state of Rep #1 of the PDSCH is determined by the first TCI state (TCI #1) activated by the MAC-CE for CORESET #1.

Method 1-2: the TCI state of Rep #1 of the PDSCH is determined according to the second TCI state for receiving the PDCCH. For example, the reception of the PDCCH is based on the TCI state of CORESET #1 corresponding to the PDCCH, and the TCI state of Rep #1 of the PDSCH is determined by the second TCI state (TCI #2) activated by the MAC-CE for CORESET #1.

Method 2-1: the TCI state of Rep #1 of the PDSCH is determined according to the TCI state of a lowest ID used for receiving the PDCCH. For example, the reception of the PDCCH is based on the TCI state of CORESET #1 corresponding to the PDCCH, and the TCI state of Rep #1 of the PDSCH is determined by the TCI state (TCI #1) with the lowest ID activated by the MAC-CE for CORESET #1.

Method 2-2: the TCI state of Rep #1 of the PDSCH is determined according to the TCI state of a maximum ID used for receiving the PDCCH. For example, the reception of the PDCCH is based on the TCI state of CORESET #1 corresponding to the PDCCH, and the TCI state of Rep #1 of the PDSCH is determined by the TCI state (TCI #2) with the maximum ID activated by the MAC-CE for CORESET #1.

Method 3-1: the TCI state of Rep #1 of the PDSCH is determined according to a TCI state (TCI #1) applied by an earliest symbol used for receiving the PDCCH. For example, the earliest symbol for receiving the PDCCH is a first symbol in slot n, and the TCI state of Rep #1 of the PDSCH is determined by a TCI state applied by the PDCCH on the symbol.

Method 3-2: the TCI state of Rep #1 of the PDSCH is determined according to a TCI state (TCI #2) applied by a latest symbol used for receiving the PDCCH. For example, the latest symbol for receiving the PDCCH is a second symbol in slot n, and the TCI state of Rep #1 of the PDSCH is determined by a TCI state applied by the PDCCH on the symbol.

In this example, according to the method in the embodiment of this disclosure, UE may determine a TCI state of Rep #2 of the PDSCH according to the following method:

as the TCI states corresponding to the PDCCH are TCI #1 and TCI #2, after the TCI state of Rep #1 of the PDSCH is determined according to the above methods, the UE may select a TCI state not used for Rep #1 of the PDSCH from TCI #1 and TCI #2 and take it as the TCI state of Rep #2 of the PDSCH.

For example, if the TCI state of Rep #1 of the PDSCH is determined to be TCI #1 according to method 1-1, the TCI state of Rep #2 of the PDSCH is determined to be TCI #2.

For another example, if the TCI state of Rep #1 of the PDSCH is determined to be TCI #2 according to method 1-2, the TCI state of Rep #2 of the PDSCH is determined to be TCI #1, and so on, which shall not be described herein any further.

In the example in FIG. 7, the PDCCH has no repetitions, and PDSCH has repetitions. In addition, FIG. 7 shows a case of TDM, and a case of FDM is similar to that of TDM, which may be deduced according to the methods in FIG. 3, which shall not be described herein any further.

Figure 8:
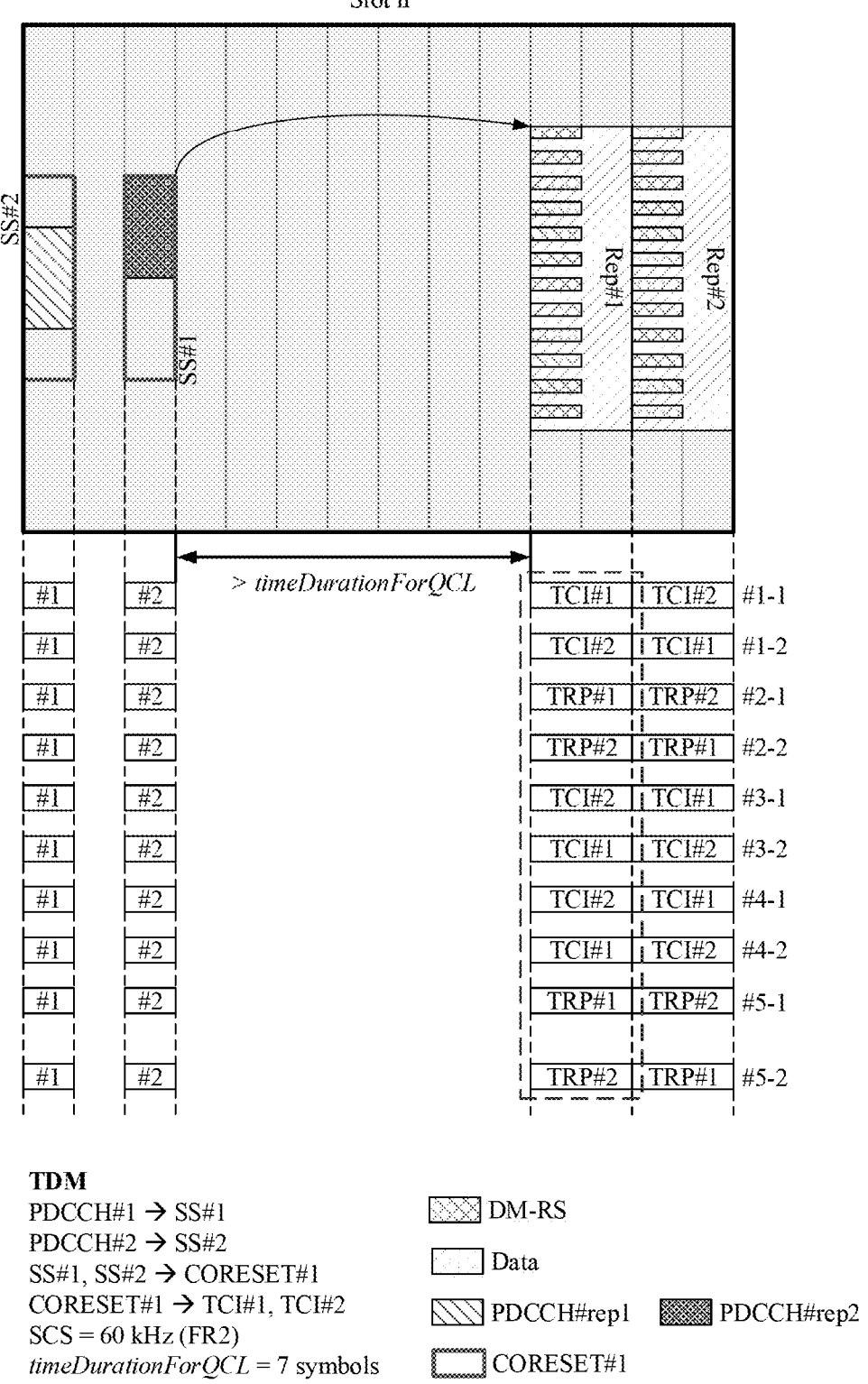
FIG. 8 is another schematic diagram of the mapping relationship between a TCI state of a PDCCH and a TCI state of a multi-TCI PDSCH scheduled by the PDCCH.

FIG. 8 is another schematic diagram of the mapping relationship between a TCI state of a PDCCH and a TCI state of a multi-TCI PDSCH scheduled by the PDCCH.

As shown in FIG. 8, the UE receives a PDCCH (control information) at a slot n, and the PDCCH schedules a PDSCH (channel or signal). A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH does not include a TCI field; and the PDCCH includes two parts, PDCCH #rep1 and PDCCH #rep2, wherein PDCCH #rep1 and PDCCH #rep2 correspond to identical DCI bits; search spaces corresponding to the PDCCH are SS #1 and SS #2, respectively; where, SS #1 is located at a first symbol in slot n, and SS #2 is located at a third symbol in slot n. For example, UE learns in advance that SS #1 and SS #2 are associated, SS #1 corresponds to a first SS, and SS #2 corresponds to a second SS. Repetitions corresponding to a PDCCH may be respectively received on these two SSs; according to configuration of RRC signaling, CORESETs corresponding to search spaces SS #1 and SS #2 are both CORESET #1, and two TCI states of CORESET #1, i.e., TCI #1 and TCI #2, are activated by MAC-CE activation signaling, wherein a first TCI state activated by the MAC-CE activation signaling is TCI #1, where, SS #2 corresponds to TCI #1, and a second TCI state activated by the MAC-CE activation signaling is TCI #2, where, SS #1 corresponds to TCI #2; in addition, a TCI state applied at a first symbol in slot n is TCI #1, and a TCI state applied at a third symbol in slot n is TCI #2.

In this example, according to the method in the embodiment of this disclosure, the UE may determine that the PDSCH is associated with two TCI states according to method 1 or method 2 below:

method 1: before the UE receives the PDCCH and PDSCH, the UE receives RRC signaling, and the UE determines that the PDSCH is associated with two TCI states according to the RRC signaling;

method 2: the UE determines that the PDSCH is associated with two TCI states according to a TDRA field in a DCI format corresponding to the PDCCH.

In this example, according to the method in the embodiment of this disclosure, the UE may determine a TCI state of Rep #1 of the PDSCH according to methods as below.

Method 1-1: the TCI state of Rep #1 of the PDSCH is determined according to the first TCI state used for monitoring the PDCCH. For example, the monitoring of the PDCCH is based on one of the two TCI states of CORESET #1 corresponding to the PDCCH, and the TCI state of Rep #1 of the PDSCH is determined by the first TCI state (TCI #1) activated by the MAC-CE for CORESET #1.

Method 1-2: the TCI state of Rep #1 of the PDSCH is determined according to the second TCI state for monitoring the PDCCH. For example, the monitoring of the PDCCH is based on one of the two TCI states of CORESET #1 corresponding to the PDCCH, and the TCI state of Rep #1 of the PDSCH is determined by a second TCI state (TCI #2) activated by the MAC-CE for CORESET #1.

Method 2-1: the TCI state of Rep #1 of the PDSCH is determined according to the TCI state of a lowest ID used for monitoring the PDCCH. For example, the monitoring of the PDCCH is based on one of the two TCI states of CORESET #1 corresponding to the PDCCH, and the TCI state of Rep #1 of the PDSCH is determined by the TCI state (TCI #1) with the lowest ID activated by the MAC-CE for CORESET #1.

Method 2-2: the TCI state of Rep #1 of the PDSCH is determined according to the TCI state of a maximum ID used for monitoring the PDCCH. For example, the monitoring of the PDCCH is based on one of the two TCI states of CORESET #1 corresponding to the PDCCH, and the TCI state of Rep #1 of the PDSCH is determined by the TCI state (TCI #2) with the maximum ID activated by the MAC-CE for CORESET #1.

Method 3-1: the TCI state of Rep #1 of the PDSCH is determined according to a TCI state of a first SS used for monitoring the PDCCH. For example, the monitoring of the PDCCH is based on one of the two SSs corresponding to the PDCCH, and the TCI state of Rep #1 of the PDSCH is determined by the TCI state (TCI #2) of the first SS (SS #1) activated by the MAC-CE for CORESET #1.

Method 3-2: the TCI state of Rep #1 of the PDSCH is determined according to a TCI state of a second SS used for monitoring the PDCCH. For example, the monitoring of the PDCCH is based on one of the two SSs corresponding to the PDCCH, and the TCI state of Rep #1 of the PDSCH is determined by the TCI state (TCI #1) of the second SS (SS #2) activated by the MAC-CE for CORESET #1.

Method 4-1: the TCI state of Rep #1 of the PDSCH is determined according to a TCI state of an SS of a lowest ID used for monitoring the PDCCH. For example, the monitoring of the PDCCH is based on one of the two SSs corresponding to the PDCCH, and the TCI state of Rep #1 of the PDSCH is determined by a TCI state (TCI #2) used for the SS with the lowest ID activated by the MAC-CE for CORESET #1.

Method 4-2: the TCI state of Rep #1 of the PDSCH is determined according to a TCI state of an SS of a maximum ID used for monitoring the PDCCH. For example, the monitoring of the PDCCH is based on one of the two SSs corresponding to the PDCCH, and the TCI state of Rep #1 of the PDSCH is determined by a TCI state (TCI #2) used for the SS with the maximum ID (SS #2) activated by the MAC-CE for CORESET #1.

Method 5-1: the TCI state of Rep #1 of the PDSCH is determined according to a TCI state (TCI #1) applied by an earliest symbol used for monitoring the PDCCH. For example, the earliest symbol corresponding to the monitoring of the PDCCH is a first symbol in slot n, and the TCI state of Rep #1 of the PDSCH is determined by a TCI state applied by the PDCCH on the symbol.

Method 5-2: the TCI state of Rep #1 of the PDSCH is determined according to a TCI state (TCI #2) applied by a latest symbol used for monitoring the PDCCH. For example, the latest symbol corresponding to the monitoring of the PDCCH is a third symbol in slot n, and the TCI state of Rep #1 of the PDSCH is determined by a TCI state applied by the PDCCH on the symbol.

In this example, according to the method in the embodiment of this disclosure, UE may determine a TCI state of Rep #2 of the PDSCH according to the following method:

as the TCI states corresponding to the PDCCH are TCI #1 and TCI #2, after the TCI state of Rep #1 of the PDSCH is determined according to the above methods, the UE may select a TCI state not used for Rep #1 of the PDSCH from TCI #1 and TCI #2 and take it as the TCI state of Rep #2 of the PDSCH.

For example, if the TCI state of Rep #1 of the PDSCH is determined to be TCI #1 according to method 1-1, the TCI state of Rep #2 of the PDSCH is determined to be TCI #2.

For another example, if the TCI state of Rep #1 of the PDSCH is determined to be TCI #2 according to method 1-2, the TCI state of Rep #2 of the PDSCH is determined to be TCI #1, and so on, which shall not be described herein any further.

In the example in FIG. 8, both the PDCCH and PDSCH have repetitions. In addition, FIG. 8 shows a case of two search space sets and one CORESET, and a case of one search space set and two CORESETs and a case of two search space sets and two CORESETs are similar to the case of two search space sets and one CORESET, which may be analogized according to the methods in FIGS. 5 and 6, and shall not be described herein any further.

It should be noted that FIG. 1 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 1.

According to the method of the embodiment of this disclosure, as described above, uncertainty of the TCI state of the channel or the signal may be avoided, and the overhead caused by indicating the TCI state of the channel or the signal in the control information may be lowered.

Embodiment of a Second Aspect

The embodiment of this disclosure provides a wireless communication method, which shall be described from a side of a network device.

FIG. 9 is a schematic diagram of the wireless communication method of the embodiment of a second aspect of this disclosure. As shown in FIG. 9, the method includes:

901: a network device transmits control information, the control information being related to two TCI states, and a DCI format corresponding to the control information including a TCI field.

In the embodiment of this disclosure, if the control information is related to two TCI states, the DCI format corresponding to the control information includes the TCI field.

In the embodiment of this disclosure, the above control information triggers a channel or a signal. The channel or the signal may be a downlink channel or a downlink signal, such as a PDSCH or CSI-RS, and it may also be an uplink channel or an uplink signal, such as a PUSCH, a PUCCH and/or an SRS; however, this disclosure is not limited thereto.

In the embodiment of this disclosure, the TCI state of the above channel or the above signal is indicated by the TCI field of the DCI format corresponding to the control information. For example, whether the channel or the signal is associated with one TCI state or two TCI states is indicated via the TCI field.

According to the method of the embodiment of this disclosure, when a piece of control information triggers a channel or a signal, if the control information is associated with two TCI states, the control information includes the TCI field. With this method, the control information may be enabled to always include the TCI field, and the TCI state of the signal or channel triggered by the control information is indicated by the TCI field included therein, thus clarifying the TCI state of the signal or channel, and making indication of the TCI state of the signal or channel more flexible.

In some embodiments, that the control information is related to two TCI states refers to that transmission of the control information is related to two TCI states.

In some embodiments, the DCI format corresponding to the control information including a TCI field refers to that: the network device sets a parameter tci-PresentInDCI of a control resource set associated with the DCI format as being enabled, or the network device sets a parameter tci-PresentInDCI of all control resource sets associated with the DCI format as being enabled, or, the network device configures a parameter tci-PresentInDCI-ForFormat1_2 of a control resource set associated with the DCI format, or, the network device configures a parameter tci-PresentInDCI-ForFormat1_2 of all control resource sets associated with the DCI format.

For example, the above conditions may be described as follows:

---

➢ For at least one of the one or more CORESETs associated with the DCI format,
  ■ tci-PresentInDCI is set as 'enabled'; or
  ■ tci-PresentInDCI-ForFormat1_2 is configured

---

The method of the embodiment of this disclosure shall be described below by way of examples.

Figure 10:
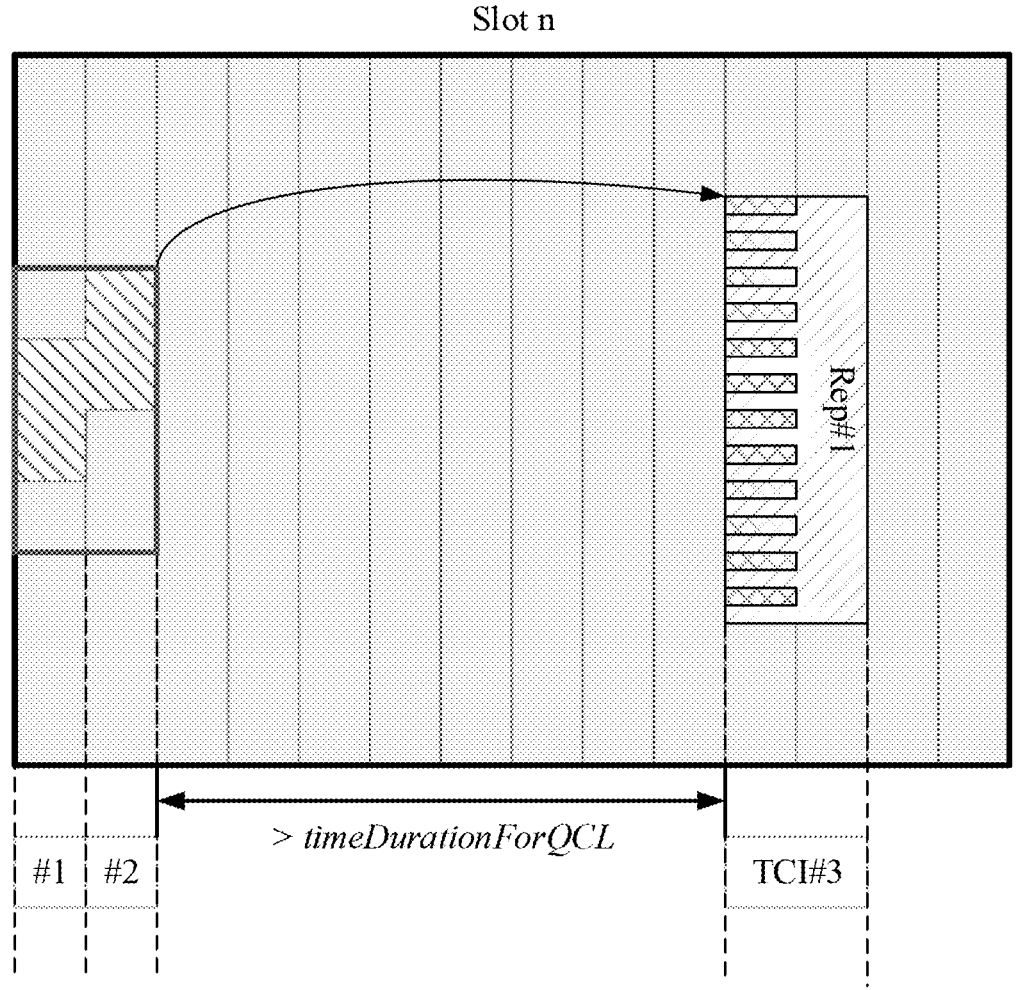
FIG. 10 is a schematic diagram of a mapping relationship between a TCI state of a PDCCH and a TCI state of a single-TCI PDSCH scheduled by the PDCCH.

FIG. 10 is a schematic diagram of a mapping relationship between the TCI state of the PDCCH and the TCI state of the single-TCI PDSCH scheduled by the PDCCH. FIG. 10 is described from the perspective of transmission of a base station, and a PDSCH is taken as an example.

As shown in FIG. 10, a gNB transmits a PDCCH (control information) at slot n, and the PDCCH schedules a PDSCH (channel or signal), the PDSCH being associated with a TCI state. A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH includes a TCI field. For example, the DCI format is DCI format 1_1, and a CORESET (CORESET #1) corresponding to the DCI format is configured with an IE, i.e., tci-PresentInDCI, and tci-PresentInDCI is set to be 'enable'; for another example, the DCI format is DCI format 1_2, a CORESET (CORESET #1) corresponding to the DCI format is configured with an IE, i.e., tci-PresentForDCI-Format1-2.

In addition, a TCI codepoint indicated by the TCI field of the PDCCH includes a TCI state, i.e., TCI #3.

In addition, a search space corresponding to the PDCCH is SS #1, a CORESET corresponding to the search space SS #1 is CORESET #1, and two TCI states of CORESET #1, i.e., TCI #1 and TCI #2, are activated by MAC-CE activation signaling, wherein a first TCI state activated by the MAC-CE activation signaling is TCI #1, and a second TCI state activated by the MAC-CE activation signaling is TCI #2; in addition, a TCI state applied at a first symbol in slot n is TCI #1, and a TCI state applied at second symbol in slot n is TCI #2.

In this example, when the gNB transmits a DCI format scheduling the PDSCH and the DCI format is related to two TCI states (or when the DCI format is transmitted via two TRPs), in order to avoid that the TCI state of the PDSCH scheduled by the DCI format is unclear, the DCI format necessarily includes a TCI field. Moreover, in this example, the TCI field indicates a TCI state, which is the TCI state applied to the PDSCH scheduled by the DCI format, i.e., TCI #3.

Figure 11:
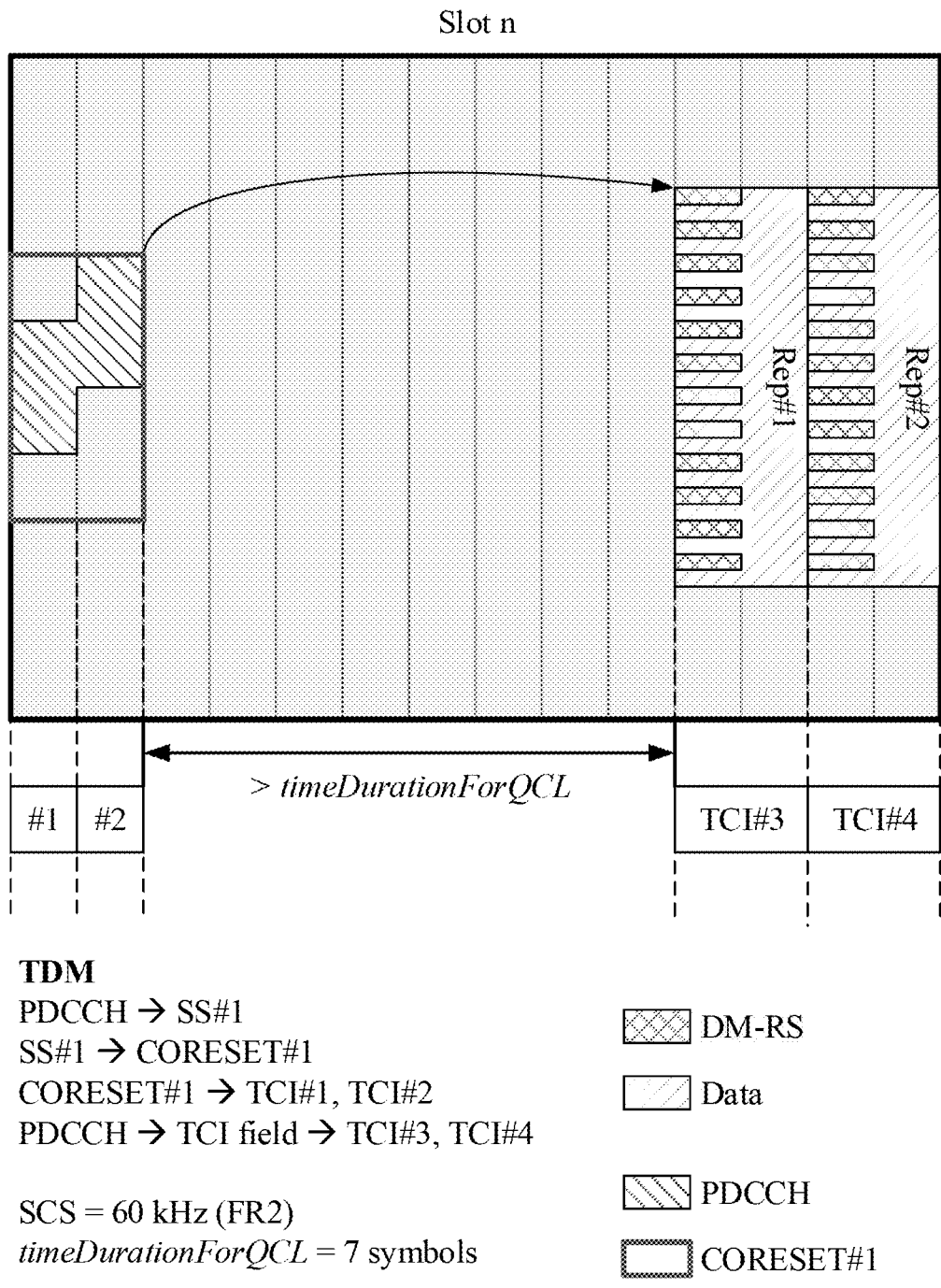
FIG. 11 is a schematic diagram of a mapping relationship between a TCI state of a PDCCH and a TCI state of a multi-TCI PDSCH scheduled by the PDCCH.

FIG. 11 is a schematic diagram of a mapping relationship between the TCI state of the PDCCH and the TCI state of the multi-TCI PDSCH scheduled by the PDCCH. FIG. 11 is described from the perspective of transmission of a base station, and a PDSCH is taken as an example.

As shown in FIG. 11, a gNB transmits a PDCCH (control information) at slot n, and the PDCCH schedules a PDSCH (channel or signal), the PDSCH being associated with a TCI state. A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH includes a TCI field. For example, the DCI format is DCI format 1_1, and a CORESET (CORESET #1) corresponding to the DCI format is configured with an IE, i.e., tci-PresentInDCI, and tci-PresentInDCI is set to be 'enable'; for another example, the DCI format is DCI format 1_2, a CORESET (CORESET #1) corresponding to the DCI format is configured with an IE, i.e., tci-PresentForDCI-Format1-2.

In addition, a TCI codepoint indicated by the TCI field of the PDCCH includes two TCI states, i.e., TCI #3 and TCI #4.

In addition, a search space corresponding to the PDCCH is SS #1, a CORESET corresponding to the search space SS #1 is CORESET #1, and two TCI states of CORESET #1, i.e., TCI #1 and TCI #2, are activated by MAC-CE activation signaling, wherein a first TCI state activated by the MAC-CE activation signaling is TCI #1, and a second TCI state activated by the MAC-CE activation signaling is TCI #2; in addition, a TCI state applied at a first symbol in slot n is TCI #1, and a TCI state applied at second symbol in slot n is TCI #2.

In this example, when the gNB transmits a DCI format scheduling the PDSCH and the DCI format is related to two TCI states (or when the DCI format is transmitted via two TRPs), in order to avoid that the TCI state of the PDSCH scheduled by the DCI format is unclear, the DCI format necessarily includes a TCI field. Moreover, in this example, the TCI field indicates two TCI states, which are the TCI states applied to the PDSCH scheduled by the DCI format, i.e., TCI #3 and TCI #4.

It should be noted that FIG. 9 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 9.

According to the method of the embodiment of this disclosure, as described above, when the control information is associated with two TCI states, the TCI state of the signal or channel indicated by the control information is clarified, and indication of the TCI state of the signal or channel is made more flexible.

Embodiment of a Third Aspect

The embodiment of this disclosure provides a wireless communication method, which shall be described from a side of a terminal equipment.

FIG. 12 is a schematic diagram of the wireless communication method of the embodiment of this disclosure. As shown in FIG. 12, the method includes:

1201: a terminal equipment receives control information, the control information being related to two TCI states, and a DCI format corresponding to the control information including a TCI field.

In the embodiment of this disclosure, if the control information is related to two TCI states, the DCI format corresponding to the control information includes the TCI field.

In the embodiment of this disclosure, the control information triggers a channel or a signal. The channel or the signal may be a downlink channel or a downlink signal, such as a PDSCH or a CSI-RS, and it may also be an uplink channel or an uplink signal, such as a PUSCH, a PUCCH and/or an SRS; however, this disclosure is not limited thereto.

In the embodiment of this disclosure, the TCI state of the channel or the signal is indicated by the TCI field of the DCI format corresponding to the control information. For example, whether the channel or the signal is associated with one TCI state or two TCI states is indicated via the TCI field.

According to the method of the embodiment of this disclosure, when a piece of control information triggers a channel or a signal, if the control information is associated with two TCI states, the control information includes a TCI field. In this method, the above control information is enabled to always include the TCI field, and the TCI state of the signal or channel triggered by the control information is indicated by the TCI field included therein, thus clarifying the TCI state of the signal or channel, and making indication of the TCI state of the signal or channel more flexible.

In some embodiments, that the control information is related to two TCI states refers to that reception or monitoring of the control information is related to two TCI states.

In some embodiments, the DCI format corresponding to the control information including a TCI field refers to that: the terminal equipment expects that a parameter tci-PresentInDCI of a control resource set associated with the DCI format is set as enabled, or, the terminal equipment expects that a parameter tci-PresentInDCI of all control resource sets associated with the DCI format is set as enabled, or, the terminal equipment expects that a parameter tci-PresentIn-DCI-ForFormat1_2 of a control resource set associated with the DCI format is configured, or, the terminal equipment expects that a parameter tci-PresentInDCI-ForFormat1_2 of all control resource sets associated with the DCI format is configured.

For example, the above conditions may be described as follows:

> UE expects the following for the one or more CORESETs associated with the DCI monitoring/reception
■ tci-PresentInDCI is set as 'enabled'; or
■ tci-PresentInDCI-ForFormat1_2 is configured The method of the embodiment of this disclosure shall be described below by way of examples.

Figure 13:
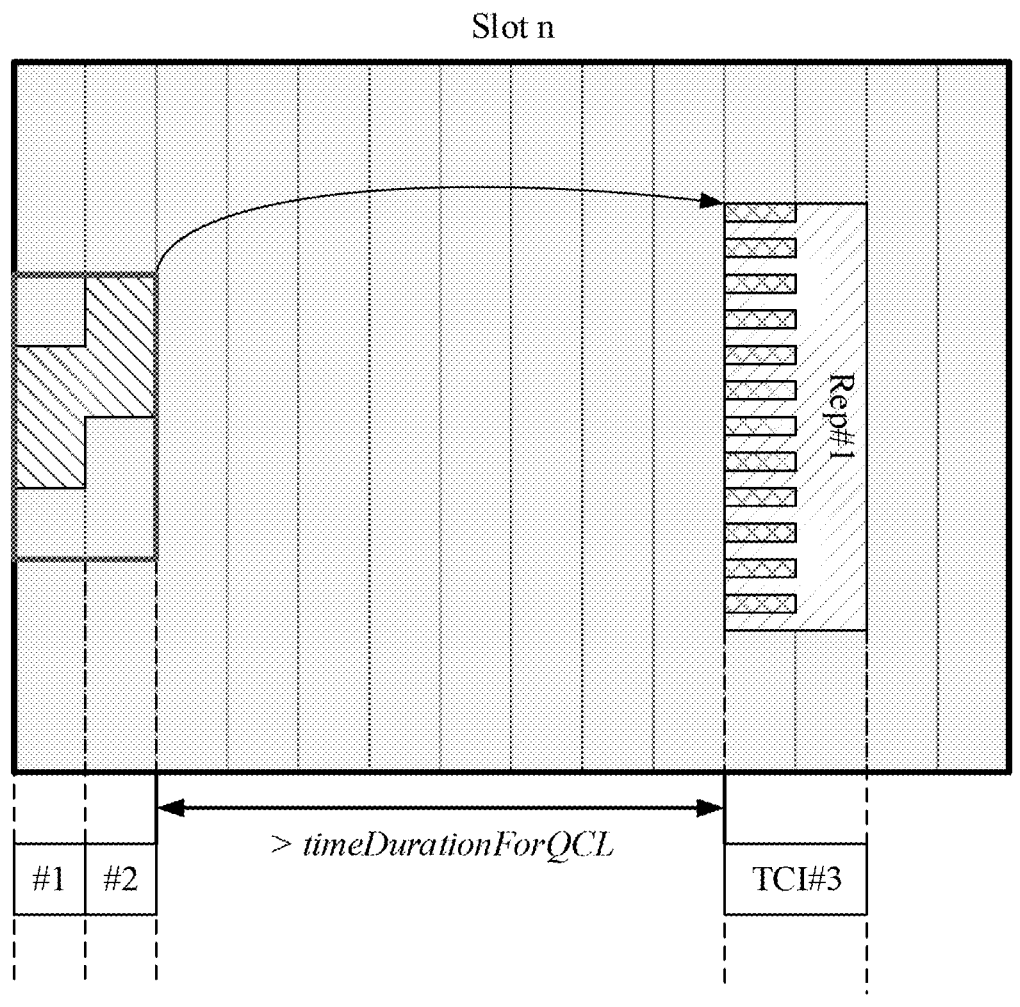
FIG. 13 is a schematic diagram of a mapping relationship between a TCI state of a PDCCH and a TCI state of a single-TCI PDSCH scheduled by the PDCCH.

FIG. 13 is a schematic diagram of a mapping relationship between a TCI state of a PDCCH and a TCI state of a single-TCI PDSCH of scheduled by the PDCCH. FIG. 13 is described from the perspective of reception of a terminal equipment (UE), and a PDSCH is taken as an example.

As shown in FIG. 13, the UE receives a PDCCH (control information) at slot n, and the PDCCH schedules a PDSCH (channel or signal), the PDSCH being associated with a TCI state. A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH includes a TCI field. For example, the DCI format is DCI format 1_1, and a CORESET (CORESET #1) corresponding to the DCI format is configured with an IE, i.e., tci-PresentInDCI, and tci-PresentInDCI is set to be 'enable'; for another example, the DCI format is DCI format 1_2, a CORESET (CORESET #1) corresponding to the DCI format is configured with an IE, i.e., tci-PresentForDCI-For-mat1-2.

In addition, a TCI codepoint indicated by the TCI field of the PDCCH includes a TCI state, i.e., TCI #3.

In addition, a search space corresponding to the PDCCH is SS #1, a CORESET corresponding to search space SS #1 is CORESET #1, and two TCI states of CORESET #1, i.e., TCI #1 and TCI #2, are activated by MAC-CE activation signaling, wherein a first TCI state activated by the MAC-CE activation signaling is TCI #1, and a second TCI state activated by the MAC-CE activation signaling is TCI #2; in addition, a TCI state applied at a first symbol in slot n is TCI #1, and a TCI state applied at second symbol in slot n is TCI #2.

In this example, when the UE receives a DCI format scheduling the PDSCH and the DCI format is related to two TCI states (or when the DCI format is received via two TRPs), the DCI format necessarily includes a TCI field, that is, the UE expects that the DCI format includes a TCI field. Moreover, in this example, the TCI field indicates a TCI state, which is the TCI state applied to the PDSCH scheduled by the DCI format, i.e., TCI #3.

Figure 14:
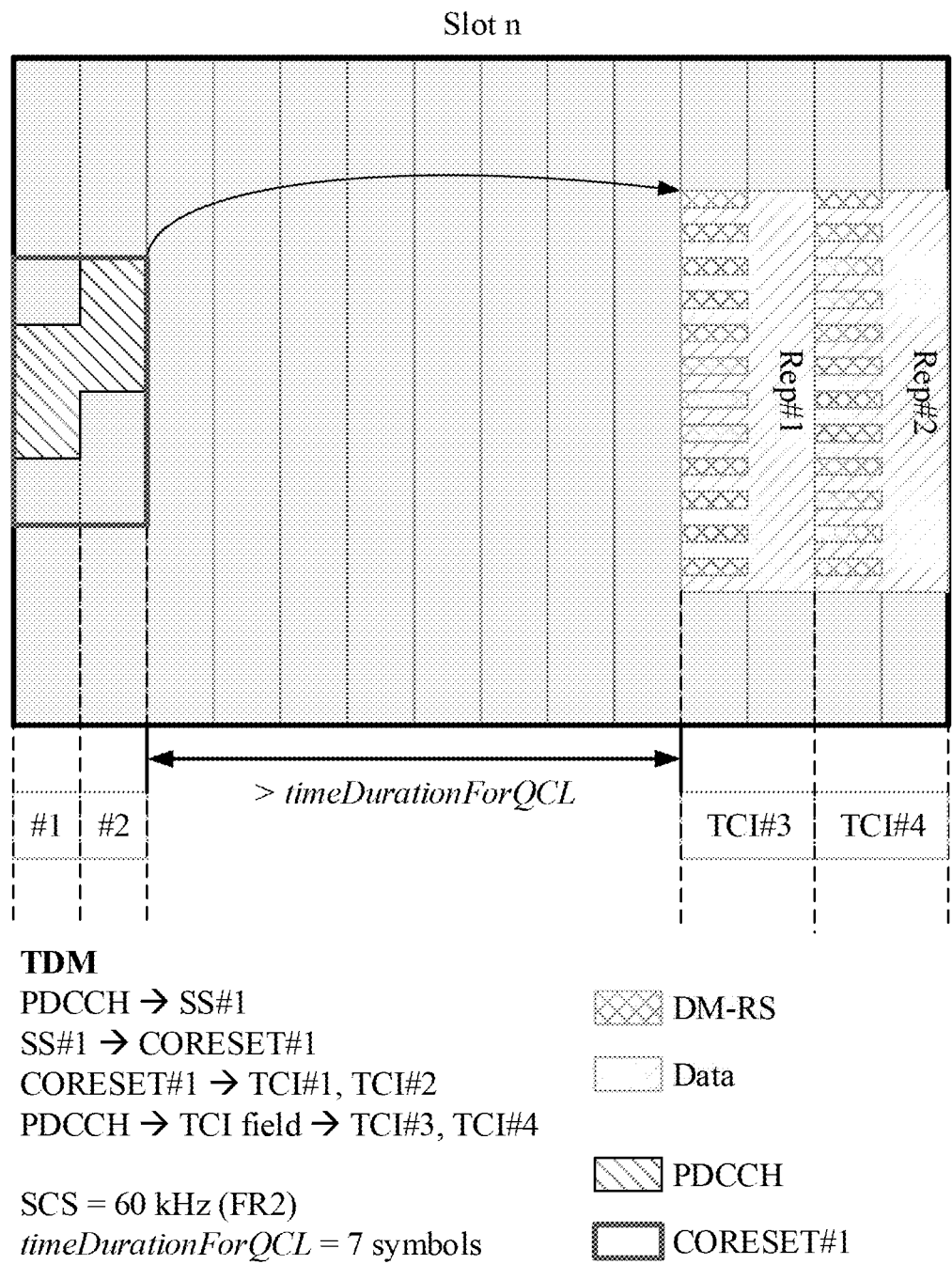
FIG. 14 is a schematic diagram of a mapping relationship between a TCI state of a PDCCH and a TCI state of a multi-TCI PDSCH scheduled by the PDCCH.

FIG. 14 is a schematic diagram of a mapping relationship between a TCI state of a PDCCH and a TCI state of a multi-TCI PDSCH scheduled by the PDCCH. FIG. 14 is described from the perspective of reception of a terminal equipment (UE), and a PDSCH is taken as an example.

As shown in FIG. 14, the UE receives a PDCCH (control information) at slot n, and the PDCCH schedules a PDSCH (channel or signal), the PDSCH being associated with a TCI state. A scheduling offset between the PDCCH and the PDSCH is greater than or equal to timeDurationForQCL. In this example, assuming SCS=60 kHz, a corresponding UE capability timeDurationForQCL is of 7 symbols.

In addition, a DCI format corresponding to the PDCCH includes a TCI field. For example, the DCI format is DCI format 1_1, and a CORESET (CORESET #1) corresponding to the DCI format is configured with an IE, i.e., tci-PresentInDCI, and tci-PresentInDCI is set to be 'enable', for another example, the DCI format is DCI format 1_2, a CORESET (CORESET #1) corresponding to the DCI format is configured with an IE, i.e., tci-PresentForDCI-Format1-2.

In addition, a TCI codepoint indicated by the TCI field of the PDCCH includes two TCI states, i.e., TCI #3 and TCI #4.

In addition, a search space corresponding to the PDCCH is SS #1, a CORESET corresponding to search space SS #1 is CORESET #1, and two TCI states of CORESET #1, i.e., TCI #1 and TCI #2, are activated by MAC-CE activation signaling, wherein a first TCI state activated by the MAC-CE activation signaling is TCI #1, and a second TCI state activated by the MAC-CE activation signaling is TCI #2; in addition, a TCI state applied at a first symbol in slot n is TCI #1, and a TCI state applied at second symbol in slot n is TCI #2.

In this example, when the UE receives a DCI format scheduling the PDSCH and the DCI format is related to two TCI states (or when the DCI format is received via two TRPs), the DCI format necessarily includes a TCI field, that is, the UE expects that the DCI format includes a TCI field. Moreover, in this example, the TCI field indicates two TCI states, which are the TCI states applied to the PDSCH scheduled by the DCI format, i.e., TCI #3 and TCI #4.

It should be noted that FIG. 12 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 12.

According to the method of the embodiment of this disclosure, as described above, when the control information is associated with two TCI states, the TCI state of the signal or channel indicated by the control information is clarified, and indication of the TCI state of the signal or channel is made more flexible.

Embodiment of a Fourth Aspect

The embodiment of this disclosure provides a wireless communication apparatus. The apparatus may be, for example, a terminal equipment, or one or some components or assemblies configured in the terminal equipment.

Figures 15, 16, 17:
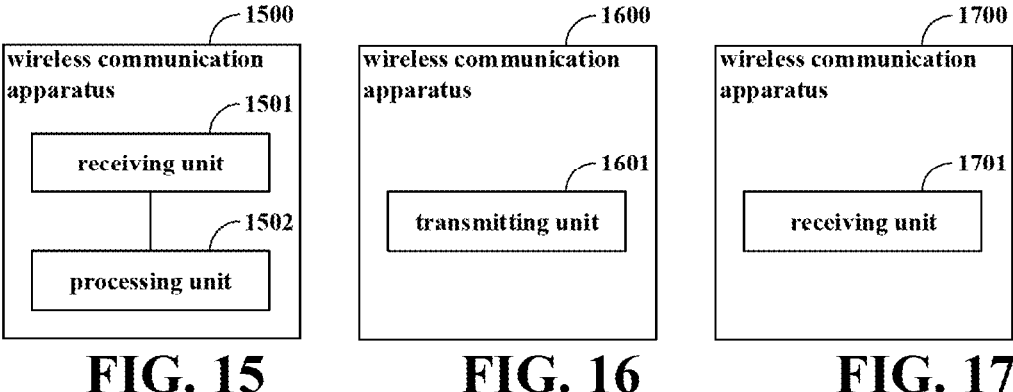
FIG. 15 is a schematic diagram of the wireless communication apparatus of an embodiment of a fourth aspect of this disclosure.
FIG. 16 is a schematic diagram of the wireless communication apparatus of an embodiment of a fifth aspect of this disclosure.
FIG. 17 is a schematic diagram of the wireless communication apparatus of an embodiment of a sixth aspect of this disclosure.

FIG. 15 is a schematic diagram of the wireless communication apparatus of an embodiment of this disclosure. As principles of the apparatus are similar to that of the method in the embodiment of the first aspect, reference may be made to the implementation of the method in the embodiment of the first aspect for implementation of the apparatus, with identical contents being not going to be repeated herein any further.

As shown in FIG. 15, a wireless communication apparatus 1500 of the embodiment of this disclosure includes:

a receiving unit 1501 configured to receive control information, the control information triggering a channel or a signal, reception or monitoring of the control information being related to two TCI states, and a DCI format corresponding to the control information including no TCI field; and a processing unit 1502 configured to transmit or receive the channel or the signal according to the two TCI states or according to one of the two TCI states.

In the embodiment of this disclosure, the channel or the signal is a downlink channel or a downlink signal or an uplink channel or an uplink signal, the downlink channel or the downlink signal being a PDSCH or a CSI-RS, and the uplink channel or the uplink signal being at least one of a PUSCH, a PUCCH or an SRS.

In some embodiments, the one of the two TCI states refers to at least one of the following:

a first TCI state indicated by an MAC-CE command in TCI states of a control resource set (CORESET) used for receiving or monitoring the control information;

a TCI state of a lowest ID in TCI states of a control resource set (CORESET) used for receiving or monitoring the control information;

a TCI state applied by a first control resource set indicated by RRC signaling in two control resource sets used for receiving or monitoring the control information;

a TCI state applied by a control resource set of a lowest ID in two control resource sets used for receiving or monitoring the control information;

a TCI state corresponding to a first search space set indicated by RRC signaling in two search space sets used for receiving or monitoring the control information;

a TCI state corresponding to a search space set of a lowest ID in two search space sets used for receiving or monitoring the control information; or a TCI state applied by a time frequency resource used for receiving or monitoring the control information.

In some embodiments, the time frequency resource used for receiving or monitoring the control information is one of the following:

an earliest symbol used for receiving or monitoring the control information;

a PRB of a lowest index used for receiving or monitoring the control information; and a PRB of a lowest index in an earliest symbol used for receiving or monitoring the control information.

In some embodiments, the channel or the signal is a PDSCH, the PDSCH being related to a first TCI state, and the first TCI state referring to at least one of the following:

a first TCI state indicated by an MAC-CE command in TCI states of a control resource set (CORESET) used for receiving or monitoring the control information;

a TCI state of a lowest ID in TCI states of a control resource set (CORESET) used for receiving or monitoring the control information;

a TCI state applied by a first control resource set indicated by RRC signaling in two control resource sets used for receiving or monitoring the control information;

a TCI state applied by a control resource set of a lowest ID in two control resource sets used for receiving or monitoring the control information;

a TCI state corresponding to a first search space set indicated by RRC signaling in two search space sets used for receiving or monitoring the control information;

a TCI state corresponding to a search space set of a lowest ID in two search space sets used for receiving or monitoring the control information; or 27                                                                28 a TCI state applied by a time frequency resource used for receiving or monitoring the control information.

In some embodiments, the time frequency resource used for receiving or monitoring the control information is one of the following:

an earliest symbol used for receiving or monitoring the control information;

a PRB of a lowest index used for receiving or monitoring the control information; and a PRB of a lowest index in an earliest symbol used for receiving or monitoring the control information.

In some embodiments, the PDSCH is further related to a second TCI state, the second TCI state referring to: a TCI state in the two TCI states other than the first TCI state.

In some embodiments, according to RRC signaling or a DCI field of the DCI format, the processing unit 1502 determines to transmit or receive the channel or the signal according to the two TCI states.

In some embodiments, according to RRC signaling or a DCI field of the DCI format, the processing unit 1502 determines to transmit or receive the channel or the signal according to one of the two TCI states.

In some embodiments, the DCI field of the DCI format is a TDRA field of the DCI format.

In some embodiments, the RRC signaling is used to indicate whether the channel or the signal is related to one TCI state or two TCI states. Hence, according to the RRC signaling, the terminal equipment determines whether to transmit or receive the channel or the signal according to the two TCI states or transmit or receive the channel or the signal according to one of the two TCI states.

In some embodiments, a time offset between the control information and the channel or the signal is greater than or equal to a predetermined time period.

It should be noted that the components or modules related to this disclosure are only described above. However, this disclosure is not limited thereto, and the wireless communication apparatus 1500 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIG. 15. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

According to the apparatus of the embodiment of this disclosure, similar to the embodiment of the first aspect, uncertainty of the TCI state of the channel or the signal may be avoided, and the overhead caused by indicating the TCI state of the channel or the signal in the control information may be lowered.

Embodiment of a Fifth Aspect

The embodiment of this disclosure provides a wireless communication apparatus. The apparatus may be, for example, a network device, or one or some components or assemblies configured in the network device.

FIG. 16 is a schematic diagram of the wireless communication apparatus of an embodiment of this disclosure. As principles of the apparatus are similar to that of the method in the embodiment of the second aspect, reference may be made to the implementation of the method in the embodiment of the second aspect for implementation of the apparatus, with identical contents being not going to be repeated herein any further.

As shown in FIG. 16, a wireless communication apparatus 1600 of the embodiment of this disclosure includes:

a transmitting unit 1601 configured to transmit control information, the control information being related to two TCI states, and a DCI format corresponding to the control information including a TCI field.

In some embodiments, if the control information is related to two TCI states, the DCI format corresponding to the control information includes a TCI field.

In some embodiments, the control information triggers a channel or a signal.

In the embodiment of this disclosure, the channel or the signal is a downlink channel or a downlink signal or an uplink channel or an uplink signal, the downlink channel or the downlink signal being a PDSCH or a CSI-RS, and the uplink channel or the uplink signal being at least one of a PUSCH, a PUCCH or an SRS.

In some embodiments, the TCI state of the channel or the signal is indicated by the TCI field. For example, the TCI field indicates whether the channel or the signal is related to one TCI state or two TCI states.

In some embodiments, that the control information is related to two TCI states refers to: transmission of the control information is related to two TCI states.

In some embodiments, the DCI format corresponding to the control information including a TCI field refers to one of the following that:

the network device sets a parameter tci-PresentInDCI of a control resource set associated with the DCI format as enabled;

the network device sets a parameter tci-PresentInDCI of all control resource sets associated with the DCI format as enabled;

the network device configures a parameter tci-PresentIn-DCI-ForFormat1_2 of a control resource set associated with the DCI format; and the network device configures a parameter tci-PresentIn-DCI-ForFormat1_2 of all control resource sets associated with the DCI format.

It should be noted that the components or modules related to this disclosure are only described above. However, this disclosure is not limited thereto, and the wireless communication apparatus 1600 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIG. 16. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

According to the apparatus of the embodiment of this disclosure, similar to the embodiment of the second aspect, when the control information is associated with two TCI states, the TCI state of the signal or channel indicated by the control information is clarified, and indication of the TCI state of the signal or channel is made more flexible.

Embodiment of a Sixth Aspect

The embodiment of this disclosure provides a wireless communication apparatus. The apparatus may be, for example, a terminal equipment, or one or some components or assemblies configured in the terminal equipment.

FIG. 17 is a schematic diagram of the wireless communication apparatus of an embodiment of this disclosure. As principles of the apparatus are similar to that of the method in the embodiment of the third aspect, reference may be made to the implementation of the method in the embodiment of the third aspect for implementation of the apparatus, with identical contents being not going to be repeated herein any further.

As shown in FIG. 17, a wireless communication apparatus 1700 of the embodiment of this disclosure includes:

a receiving unit 1701 configured to receive control information, the control information being related to two TCI states, and a DCI format corresponding to the control information including a TCI field.

In some embodiments, if the control information is related to two TCI states, the DCI format corresponding to the control information includes a TCI field.

In some embodiments, the control information triggers a channel or a signal.

In the embodiment of this disclosure, the channel or the signal is a downlink channel or a downlink signal or an uplink channel or an uplink signal, the downlink channel or the signal being a PDSCH or a CSI-RS, and the uplink channel or the signal being at least one of a PUSCH, a PUCCH or an SRS.

In some embodiments, the TCI state of the channel or the signal is indicated by the TCI field. For example, the TCI field indicates whether the channel or the signal is related to one TCI state or two TCI states.

In some embodiments, that the control information is related to two TCI states refers to that reception or monitoring of the control information is related to two TCI states.

In some embodiments, the DCI format including a TCI field refers to one of the following that:

the terminal equipment expects that a parameter tci-PresentInDCI of a control resource set associated with the DCI format is set as enabled;

the terminal equipment expects that a parameter tci-PresentInDCI of all control resource sets associated with the DCI format is set as enabled;

the terminal equipment expects that a parameter tci-PresentInDCI-ForFormat1_2 of a control resource set associated with the DCI format is configured; and the terminal equipment expects that a parameter tci-PresentInDCI-ForFormat1_2 of all control resource sets associated with the DCI format is configured.

It should be noted that the components or modules related to this disclosure are only described above. However, this disclosure is not limited thereto, and the wireless communication apparatus 1700 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIG. 17. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

According to the apparatus of the embodiment of this disclosure, similar to the embodiment of the third aspect, when the control information is associated with two TCI states, the TCI state of the signal or channel indicated by the control information is clarified, and indication of the TCI state of the signal or channel is made more flexible.

Embodiment of a Seventh Aspect

Figure 18:
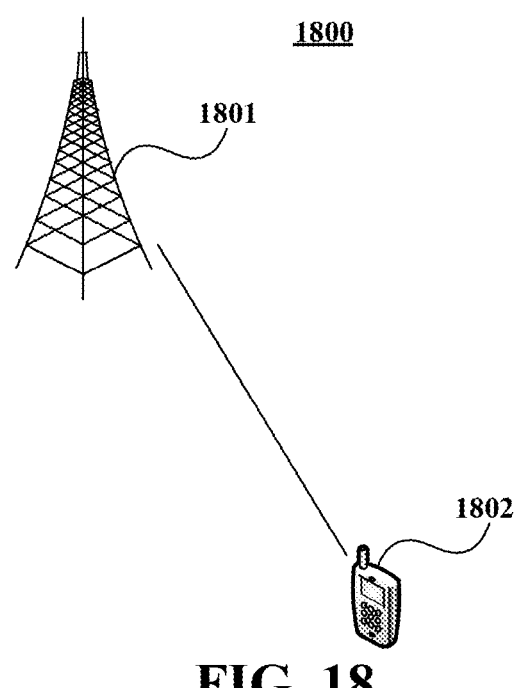
FIG. 18 is a schematic diagram of the communication system of an embodiment of a seventh aspect of this disclosure.

The embodiment of this disclosure provides a communication system. FIG. 18 is a schematic diagram of the communication system of the embodiment of this disclosure. As shown in FIG. 18, a communication system 1800 includes a network device 1801 and a terminal equipment 1802. For the sake of simplicity, an example having only one terminal equipment and one network device is schematically given in FIG. 18; however, the embodiment of this disclosure is not limited thereto.

In the embodiment of this disclosure, existing traffics or traffics that may be implemented in the future may be performed between the network device 1801 and the terminal equipment 1802. For example, such traffics may include but not limited to enhanced mobile broadband (eMBB), massive machine type communication (mMTC), ultra-reliable and low-latency communication (URLLC), and vehicle to everything (V2X).

In some embodiments, the network device 1801 generates control information and transmits the control information to the terminal equipment 1802; and the terminal equipment 1802 receives the control information, the control information triggering a channel or a signal, reception or monitoring of the control information being related to the two TCI states, and a DCI format corresponding to the control information not including a TCI field, and the terminal equipment 1802 transmits or receives the channel or the signal according to the two TCI states or according to one of the two TCI states. Relevant contents of the network device 1801 are not limited in this disclosure, and relevant contents of the terminal equipment 1802 are identical to those in the embodiments of the first and fourth aspects, which shall not be described herein any further.

In some embodiments, the network device 1801 generates control information and transmits the control information to the terminal equipment 1802, the control information being related to two TCI states, and a DCI format corresponding to the control information not including a TCI field; and the terminal equipment 1802 receives the control information. Relevant contents of the network device 1801 are identical to those in the embodiments of the second and fifth aspects, which shall not be described herein any further, and relevant contents of the terminal equipment 1802 are identical to those in the embodiments of the third and sixth aspects, which shall not be described herein any further.

The embodiment of this disclosure further provides a terminal equipment, which may be, for example, a UE; however, this disclosure is not limited thereto, and it may also be another equipment.

Figure 19:
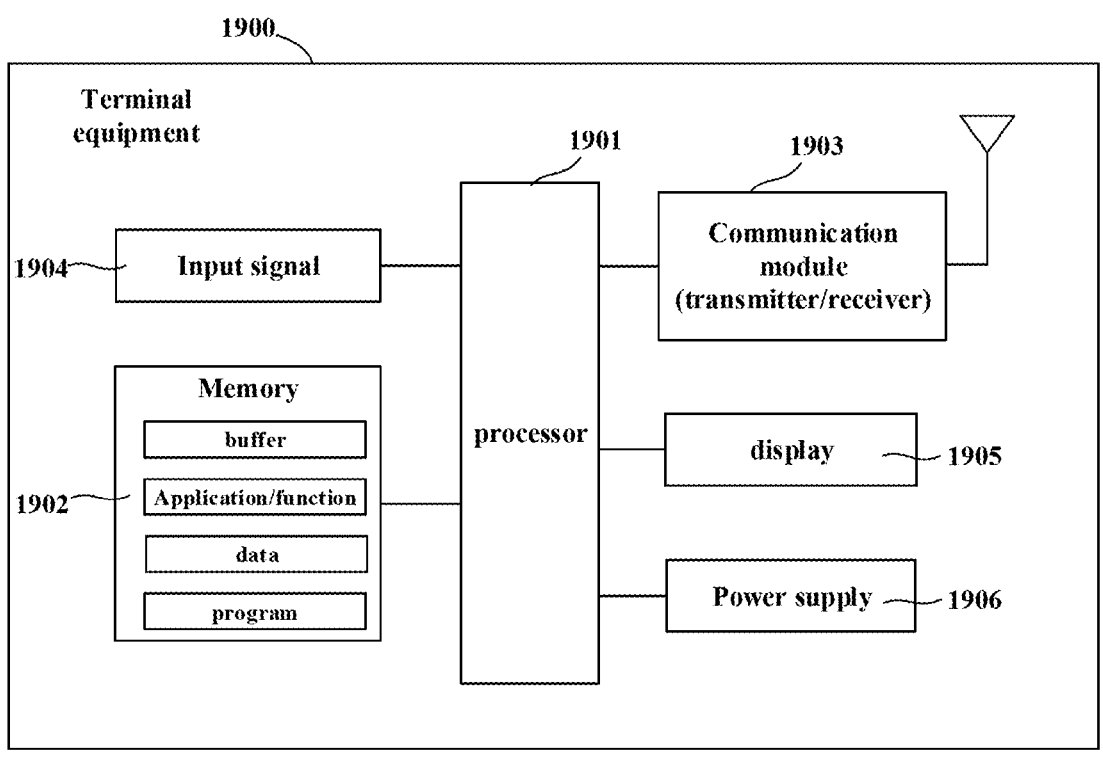
FIG. 19 is a schematic diagram of the terminal equipment of the embodiment of the seventh aspect of this disclosure.

FIG. 19 is a schematic diagram of the terminal equipment of the embodiment of this disclosure. As shown in FIG. 19, the terminal equipment 1900 may include a processor 1901 and a memory 1902, the memory 1902 storing data and a program and being coupled to the processor 1901. It should be noted that this figure is illustrative only, and other types of structures may also be used, so as to supplement or replace this structure and achieve a telecommunications function or other functions.

For example, the processor 1901 may be configured to execute a program to carry out the wireless communication method as described in the embodiments of the first or the third aspect.

As shown in FIG. 19, the terminal equipment 1900 may further include a communication module 1903, an input unit 1904, a display 1905, and a power supply 1906, wherein functions of the above components are similar to those in the related art, which shall not be described herein any further. It should be noted that the terminal equipment 1900 does not necessarily include all the parts shown in FIG. 19, and the above components are not necessary. Furthermore, the terminal equipment 1900 may include parts not shown in FIG. 19, and the related art may be referred to.

The embodiment of this disclosure further provides a network device, which may be, for example, a base station (gNB). However, this disclosure is not limited thereto, and it may also be another network device.

Figure 20:
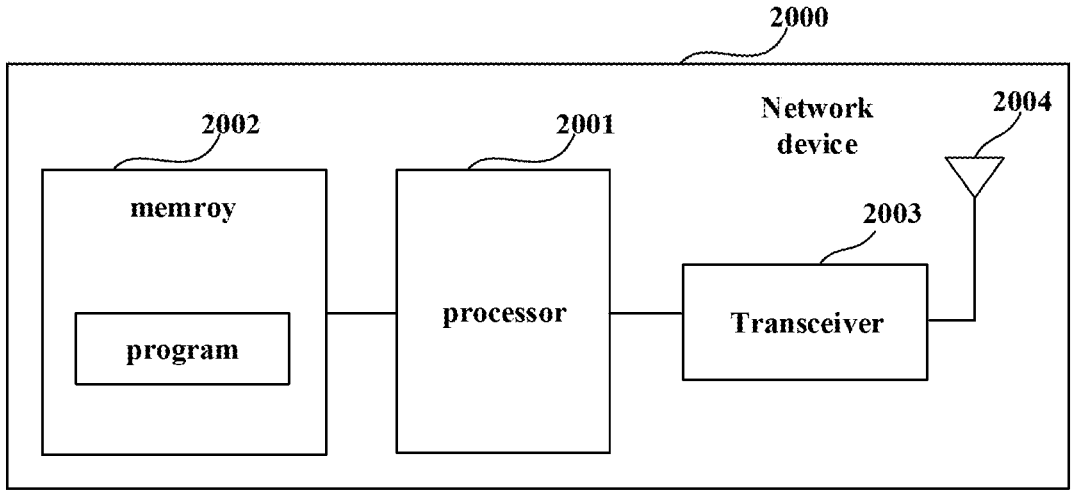
FIG. 20 is a schematic diagram of the network device of the embodiment of the seventh aspect of this disclosure.

FIG. 20 is a schematic diagram of the network device of the embodiment of this disclosure. As shown in FIG. 20, the network device 2000 may include a processor 2001 (such as a central processing unit (CPU)) and a memory 2002, the memory 2002 being coupled to the processor 2001. The memory 2002 may store various data, and furthermore, it may store a program for data processing, and execute the program under control of the processor 2001.

For example, the processor 2001 may be configured to execute a program to carry out the wireless communication method as described in the embodiment of the second aspect.

Furthermore, as shown in FIG. 20, the network device 2000 may include a transceiver 2003, and an antenna 2004, etc. Functions of the above components are similar to those in the related art, and shall not be described herein any further. It should be noted that the network device 2000 does not necessarily include all the parts shown in FIG. 20, and furthermore, the network device 2000 may include parts not shown in FIG. 20, and the related art may be referred to.

An embodiment of this disclosure provides a computer readable program, which, when executed in a terminal equipment, will cause a computer to carry out the wireless communication method as described in the embodiment of the first or the third aspect in the terminal equipment.

An embodiment of this disclosure provides a storage medium storing a computer readable program, which will cause a computer to carry out the wireless communication method as described in the embodiment of the first or the third aspect in a terminal equipment.

An embodiment of this disclosure provides a computer readable program, which, when executed in a network device, will cause a computer to carry out the wireless communication method as described in the embodiment of the second aspect in the network device.

An embodiment of this disclosure provides a storage medium storing a computer readable program, which will cause a computer to carry out the wireless communication method as described in the embodiment of the second aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to the implementations disclosed in the embodiments, following supplements are further disclosed.

1. A wireless communication method, including:
receiving control information by a terminal equipment, the control information triggering a channel or a signal, reception or monitoring of the control information being related to two TCI states, and a DCI format corresponding to the control information including no TCI field; and
transmitting or receiving the channel or the signal by the terminal equipment according to the two TCI states or according to one of the two TCI states.

2. The method according to supplement 1, wherein the one of the two TCI states refers to at least one of the following:
a first TCI state indicated by an MAC-CE command in TCI states of a control resource set (CORESET) used for receiving or monitoring the control information;

a TCI state of a lowest ID in TCI states of a control resource set (CORESET) used for receiving or monitoring the control information;

a TCI state applied by a first control resource set indicated by RRC signaling in two control resource sets used for receiving or monitoring the control information;

a TCI state applied by a control resource set of a lowest ID in two control resource sets used for receiving or monitoring the control information;

a TCI state corresponding to a first search space set indicated by RRC signaling in two search space sets used for receiving or monitoring the control information;

a TCI state corresponding to a search space set of a lowest ID in two search space sets used for receiving or monitoring the control information; or a TCI state applied by a time frequency resource used for receiving or monitoring the control information.

3. The method according to supplement 2, wherein the time frequency resource used for receiving or monitoring the control information is one of the following:

an earliest symbol used for receiving or monitoring the control information;

a PRB of a lowest index used for receiving or monitoring the control information; and a PRB of a lowest index in an earliest symbol used for receiving or monitoring the control information.

4. The method according to supplement 1, wherein the channel or the signal is a PDSCH, the PDSCH being related to a first TCI state, and the first TCI state referring to at least one of the following:

a first TCI state indicated by an MAC-CE command in TCI states of a control resource set (CORESET) used for receiving or monitoring the control information;

a TCI state of a lowest ID in TCI states of a control resource set (CORESET) used for receiving or monitoring the control information;

a TCI state applied by a first control resource set indicated by RRC signaling in two control resource sets used for receiving or monitoring the control information;

a TCI state applied by a control resource set of a lowest ID in two control resource sets used for receiving or monitoring the control information;

a TCI state corresponding to a first search space set indicated by RRC signaling in two search space sets used for receiving or monitoring the control information;

a TCI state corresponding to a search space set of a lowest ID in two search space sets used for receiving or monitoring the control information; or a TCI state applied by a time frequency resource used for receiving or monitoring the control information.

5. The method according to supplement 4, wherein the time frequency resource used for receiving or monitoring the control information is one of the following:

an earliest symbol used for receiving or monitoring the control information;

a PRB of a lowest index used for receiving or monitoring the control information; and a PRB of a lowest index in an earliest symbol used for receiving or monitoring the control information.

6. The method according to supplement 4, wherein the PDSCH is further related to a second TCI state, the second TCI state referring to:

a TCI state in the two TCI states other than the first TCI state.

7. The method according to supplement 1, wherein according to RRC signaling or a DCI field of the DCI format, the terminal equipment determines to transmit or receive the channel or the signal according to the two TCI states.

8. The method according to supplement 1, wherein according to RRC signaling or a DCI field of the DCI format, the terminal equipment determines to transmit or receive the channel or the signal according to one of the two TCI states.

9. The method according to supplement 7 or 8, wherein the DCI field of the DCI format is a TDRA field of the DCI format.

10. The method according to supplement 7 or 8, wherein the RRC signaling is used to indicate whether the channel or the signal is related to one TCI state or two TCI states.

11. The method according to supplement 1, wherein a time offset between the control information and the channel or the signal is greater than or equal to a predetermined time period.

12. The method according to any one of supplements 1-3 and 7-11, wherein the channel or the signal is a downlink channel or a downlink signal or an uplink channel or an uplink signal, the downlink channel or the signal being a PDSCH or a CSI-RS, and the uplink channel or the signal being at least one of a PUSCH, a PUCCH or an SRS.

13. A wireless communication method, including:

transmitting control information by a network device, the control information being related to two TCI states, and a DCI format corresponding to the control information including a TCI field.

14. The method according to supplement 13, wherein if the control information is related to two TCI states, the DCI format corresponding to the control information includes a TCI field.

15. The method according to supplement 13 or 14, wherein the control information triggers a channel or a signal.

16. The method according to supplement 13 or 14, wherein the control information being related to two TCI states refers to:

transmission of the control information is related to two TCI states.

17. The method according to supplement 13 or 14, wherein the DCI format corresponding to the control information including a TCI field refers to that:

the network device sets a parameter tci-PresentInDCI of a control resource set associated with the DCI format as enabled.

18. The method according to supplement 13 or 14, wherein the DCI format corresponding to the control information including a TCI field refers to that:

the network device sets a parameter tci-PresentInDCI of all control resource sets associated with the DCI format as enabled.

19. The method according to supplement 13 or 14, wherein the DCI format corresponding to the control information including a TCI field refers to that:

the network device configures a parameter tci-PresentIn-DCI-ForFormat1_2 of a control resource set associated with the DCI format.

20. The method according to supplement 13 or 14, wherein the DCI format corresponding to the control information including a TCI field refers to that:

the network device configures a parameter tci-PresentIn-DCI-ForFormat1_2 of all control resource sets associated with the DCI format.

21. The method according to supplement 15, wherein the channel or the signal is a downlink channel or a downlink signal or an uplink channel or an uplink signal, the downlink channel or the signal being a PDSCH or a CSI-RS, and the uplink channel or the signal being at least one of a PUSCH, a PUCCH or an SRS.

22. The method according to supplement 15, wherein the TCI state of the channel or the signal is indicted by the TCI field.

23. The method according to supplement 22, wherein the channel or the signal is associated with one TCI state or two TCI states.

24. A wireless communication method, including:

receiving control information by a terminal equipment, the control information being related to two TCI states, and a DCI format corresponding to the control information including a TCI field.

25. The method according to supplement 24, wherein if the control information is related to two TCI states, the DCI format corresponding to the control information includes a TCI field.

26. The method according to supplement 24, wherein the control information triggers a channel or a signal.

27. The method according to supplement 24, wherein the control information being related to two TCI states refers to: reception or monitoring of the control information is related to two TCI states.

28. The method according to supplement 24, wherein the DCI format including a TCI field refers to that: the terminal equipment expects that a parameter tci-PresentInDCI of a control resource set associated with the DCI format is set as enabled.

29. The method according to supplement 24, wherein the DCI format including a TCI field refers to that: the terminal equipment expects that a parameter tci-PresentInDCI of all control resource sets associated with the DCI format is set as enabled.

30. The method according to supplement 24, wherein the DCI format including a TCI field refers to that: the terminal equipment expects that a parameter tci-PresentInDCI-For-Format1_2 of a control resource set associated with the DCI format is configured.

31. The method according to supplement 24, wherein the DCI format including a TCI field refers to that: the terminal equipment expects that a parameter tci-PresentInDCI-For-Format1_2 of all control resource sets associated with the DCI format is configured.

32. A terminal equipment, including a memory and a processor, the memory storing a computer program, and the processor being configured to execute the computer program to carry out the method as described in any one of supplements 1-12 and 24-31.

33. A network device, including a memory and a processor, the memory storing a computer program, and the processor being configured to execute the computer program to carry out the method as described in any one of supplements 13-23.

34. A communication system, including a terminal equipment and a network device, wherein, the terminal equipment is configured to carry out the method as described in any one of supplements 24-31, and the network device is configured to carry out the method as described in any one of supplements 13-23; or the terminal equipment is configured to carry out the method as described in any one of supplements 1-12.

The invention claimed is:

1. A wireless communication apparatus, configured in a terminal equipment, the apparatus comprising:

a receiver configured to receive control information, the control information triggering a physical downlink shared channel, reception or monitoring of the control information being related to two TCI states, and a DCI format corresponding to the control information including no TCI field; and processor circuitry configured to transmit or receive the physical downlink shared channel according to one of the two TCI states;

the one of the two TCI states refers to:

a first TCI state indicated by an MAC-CE command in TCI states of a control resource set (CORESET) used for receiving or monitoring the control information;

wherein a time offset between the control information and the physical downlink shared channel is greater than or equal to a predetermined time period.

2. The apparatus according to claim 1, wherein a time frequency resource used for receiving or monitoring the control information is one of the following:

an earliest symbol used for receiving or monitoring the control information;

a PRB of a lowest index used for receiving or monitoring the control information; and a PRB of a lowest index in an earliest symbol used for receiving or monitoring the control information.

3. The apparatus according to claim 1, wherein the physical downlink shared channel being related to a first TCI state, and the first TCI state referring to at least one of the following:

a first TCI state indicated by an MAC-CE command in TCI states of a control resource set (CORESET) used for receiving or monitoring the control information;

a TCI state of a lowest ID in TCI states of a control resource set (CORESET) used for receiving or monitoring the control information;

a TCI state applied by a first control resource set indicated by RRC signaling in two control resource sets used for receiving or monitoring the control information;

a TCI state applied by a control resource set of a lowest ID in two control resource sets used for receiving or monitoring the control information;

a TCI state corresponding to a first search space set indicated by RRC signaling in two search space sets used for receiving or monitoring the control information;

a TCI state corresponding to a search space set of a lowest ID in two search space sets used for receiving or monitoring the control information; and a TCI state applied by a time frequency resource used for receiving or monitoring the control information.

4. The apparatus according to claim 3, wherein the time frequency resource used for receiving or monitoring the control information is one of the following:

an earliest symbol used for receiving or monitoring the control information;

a PRB of a lowest index used for receiving or monitoring the control information; and a PRB of a lowest index in an earliest symbol used for receiving or monitoring the control information.

5. The apparatus according to claim 3, wherein the PDSCH is further related to a second TCI state, the second TCI state referring to:

a TCI state in the two TCI states other than the first TCI state.

6. The apparatus according to claim 1, wherein according to RRC signaling or a DCI field of the DCI format, the processor circuitry determines to transmit or receive the physical downlink shared channel according to the two TCI states.

7. The apparatus according to claim 1, wherein according to RRC signaling or a DCI field of the DCI format, the processor circuitry determines to transmit or receive the physical downlink shared channel according to one of the two TCI states.

8. The apparatus according to claim 6, wherein the DCI field of the DCI format is a TDRA field of the DCI format.

9. The apparatus according to claim 6, wherein the RRC signaling is used to indicate whether the physical downlink shared channel is related to one TCI state or two TCI states.

\* \* \* \* \*